(12) United States Patent
Destro

(10) Patent No.: US 12,409,964 B2
(45) Date of Patent: Sep. 9, 2025

(54) ARTICLE BUNDLING DEVICE, PICKING SYSTEM AND METHOD FOR STACKING ARTICLES AND SECURING THE STACK OF ARTICLES WITH A BAND

(71) Applicant: TGW Logistics GmbH, Marchtrenk (AT)

(72) Inventor: Raffaele Destro, Brugherio (IT)

(73) Assignee: TGW Logistics GmbH, Marchtrenk (AT)

( * ) Notice: Subject to any disclaimer, the term of this patent is extended or adjusted under 35 U.S.C. 154(b) by 0 days.

(21) Appl. No.: 17/624,911

(22) PCT Filed: Jul. 22, 2020

(86) PCT No.: PCT/AT2020/060273
§ 371 (c)(1),
(2) Date: Jan. 5, 2022

(87) PCT Pub. No.: WO2021/011978
PCT Pub. Date: Jan. 28, 2021

(65) Prior Publication Data
US 2022/0281627 A1     Sep. 8, 2022

(30) Foreign Application Priority Data
Jul. 22, 2019  (AT) .............................. A 50660/2019

(51) Int. Cl.
*B65G 57/00*     (2006.01)
*B65B 13/04*     (2006.01)
(52) U.S. Cl.
CPC .............. *B65B 13/04* (2013.01); *B65G 57/00* (2013.01); *B65G 2203/041* (2013.01)

(58) Field of Classification Search
CPC .... B65B 13/04; B65G 57/00; B65G 2203/041
See application file for complete search history.

(56) References Cited

U.S. PATENT DOCUMENTS

| 4,547,112 A | 10/1985 | Steinhart |
| 4,667,953 A | 5/1987 | Hirakawa et al. |
| (Continued) | | |

FOREIGN PATENT DOCUMENTS

| CH | 645857 A5 | 10/1984 |
| CN | 107108134 A | 8/2017 |
| (Continued) | | |

OTHER PUBLICATIONS

International Search Report in PCT/AT2020/060273, mailed Oct. 16, 2020.

*Primary Examiner* — Lynn E Schwenning
(74) *Attorney, Agent, or Firm* — Collard & Roe, P.C.

(57) ABSTRACT

An article bundling device for stacking articles and securing the stack of articles with a band includes a banding support, onto which the articles are stackable, an automatic banding machine with a band guide, with which the band is guided around the stack of articles, a first conveying system for transporting the articles to the banding machine, from which the articles are discharged onto the banding support, and a second conveying system for transporting the secured stack of articles away from the banding machine. The conveying device of the first conveying system with its end located downstream in a first conveying direction is arranged spaced in vertical direction apart from the banding support and above the banding support. A picking system has such an article bundling device and a method operates such an article bundling device.

31 Claims, 10 Drawing Sheets

(56) References Cited

U.S. PATENT DOCUMENTS

| | | | |
|---|---|---|---|
| 4,870,807 A | 10/1989 | Palamides et al. | |
| 5,353,576 A | 10/1994 | Palamides et al. | |
| 5,414,974 A * | 5/1995 | Van de Ven | B65B 25/14 |
| | | | 53/399 |
| 5,426,921 A * | 6/1995 | Beckmann | B65B 43/185 |
| | | | 414/793 |
| 5,842,327 A * | 12/1998 | Schwede | B65B 27/086 |
| | | | 53/589 |
| 6,584,754 B1 | 7/2003 | Neri | |
| 10,442,638 B2 | 10/2019 | Kollmuss et al. | |
| 2004/0003980 A1 | 1/2004 | Hallowell et al. | |
| 2012/0279173 A1 | 11/2012 | Sakoguchi et al. | |
| 2014/0190132 A1 | 7/2014 | De Matteis | |
| 2016/0167817 A1 | 6/2016 | Mitsusada et al. | |
| 2016/0280475 A1 | 9/2016 | Kollmuss et al. | |
| 2018/0246242 A1 * | 8/2018 | Liu | G01V 1/38 |

FOREIGN PATENT DOCUMENTS

| | | |
|---|---|---|
| DE | 19615009 A1 | 10/1997 |
| EP | 0 153 983 A1 | 9/1985 |
| EP | 0 211 996 A1 | 3/1987 |
| EP | 0 279 333 A2 | 8/1988 |
| EP | 0 320 797 A1 | 6/1989 |
| EP | 1 097 887 A2 | 5/2001 |
| WO | 2012/131557 A1 | 10/2012 |

\* cited by examiner

ARTICLE BUNDLING DEVICE, PICKING SYSTEM AND METHOD FOR STACKING ARTICLES AND SECURING THE STACK OF ARTICLES WITH A BAND

CROSS REFERENCE TO RELATED APPLICATIONS

This application is the National Stage of PCT/AT2020/060273 filed on Jul. 22, 2020, which claims priority under 35 U.S.C. § 119 of Austrian Application No. A 50660/2019 filed on Jul. 22, 2019, the disclosure of which is incorporated by reference. The international application under PCT article 21(2) was not published in English.

BACKGROUND OF THE INVENTION

1. Field of the Invention

The invention relates to a picking system having a storage region, at least one article bundling device and a supply conveying system arranged between the storage region and the at least one article bundling device, and configured to transport the articles to the at least one article bundling device using loading aids.

The at least one article bundling device has a banding support which defines a support plane and on which the articles are stackable, and an automatic banding machine with a band guide, with which the band is guided around the stack of articles to form a secured stack of articles and which defines a band guiding plane which intersects with the support plane. The article bundling device further has a first conveying system for transporting the articles to the banding machine, arranged upstream of the banding machine in a first conveying direction, and comprises a conveying device configured to discharge the articles onto the banding support. The conveying device defines a discharging plane arranged with an end located downstream in the first conveying direction spaced in vertical direction apart from the banding support (from its support plane) and above the banding support. The article bundling device further has a second conveying system for transporting the secured stack of articles away from the banding machine, arranged downstream of the banding machine in a second conveying direction.

Finally, the invention relates to a method for stacking articles and for securing the stacked articles with a band wound around the stack of articles in an article bundling device, in particular in an article bundling device of the aforementioned kind, which comprises the following steps:
 a) forwarding the articles for forming a stack of articles using a first conveying system, which is arranged upstream of a banding machine in a first conveying direction and which comprises a conveying device from which the articles are discharged onto a banding support, wherein the banding machine has a band guide which guides the band around the stack of articles and defines a band guiding plane,
 b) stacking the articles to form a stack of articles on a support plane of the banding support, wherein the support plane intersects with the band guiding plane along a (bottom) intersecting line and the articles are stacked on the intersecting line,
 c) applying a band around the stack of articles using the banding machine and
 d) discharging the stack secured with the band via the second conveying system arranged downstream of the banding machine in a second conveying direction.

2. Description of the Related Art

A picking system and a method of the aforementioned kind are generally known. Above all, items of clothing, for example tops, shirts, trousers and suchlike, sealed in plastic bags are stacked and secured using a band and/or sleeve in order to make same easier to transport and handle. In particular, articles of an order can be grouped and prepared for dispatching in this way.

In this process, the positioning of the articles to be stacked and to be secured in the region of the banding machine is problematic. In particular, articles with low bending stiffness are prone to crumpling up during this operation, which makes the stack unsightly, on the one hand, and, on the other hand, also complicates the stacking as such and the further handling and the further transport.

SUMMARY OF THE INVENTION

It is therefore an object of the invention to overcome the disadvantages of the prior art and to specify an improved picking system and an improved method for stacking articles and for securing the stacked articles. In particular, the positioning of the articles in the region of the banding machine is to be improved.

The object of the invention is further achieved by means of a picking system of the kind mentioned in the beginning, in which the article bundling device is configured as above.

Finally, the object of the invention is achieved by a method of the kind mentioned in the beginning, in which an article discharged from the conveying device of the first conveying system moves to the banding support at least in sections of a trajectory without support of the article from below (i.e. unsupported), wherein the movement has a vertical component pointing downward.

The proposed measures improve the positioning of the articles in the region of the banding machine. In particular, they also enable a successful positioning and stacking of articles with low bending stiffness in the region of the banding machine, specifically in the region of the band guide, without same crumpling up. This ensures that the stack of articles remains slightly, on the one hand, and, on the other hand, facilitates the stacking as such and the further handling and the further transport. Especially items of clothing, for example tops, shirts, trousers and suchlike, sealed in plastic bags, can be stacked faultlessly with the help of the proposed measures and secured with a band and/or sleeve in order to prepare same for dispatching, for example.

Further advantageous designs and further advancements of the invention result from the subclaims as well as from the description in combination with the figures.

For example, the band guide may comprise first frame parts protruding in relation to the banding support and a second frame part connecting same, wherein the band guiding plane extends between the first frame parts and the second frame part and wherein the band guide is formed on the first frame parts and the second frame part. This enables the band and/or the sleeve to be easily guided around the stack of articles. Generally, also the use of a closed frame is conceivable, i.e. the first frame parts are connected at their top and bottom ends respectively by means of a second frame part. In other words, the band guide may in particular be configured frame-shaped and guided annularly around the stack of articles. The band guide then assumes the form of a closed band guide frame. Generally, the band guiding plane can also be considered as bounded by the band to be wound around the stack of articles.

It is favorable if the banding support has banding support tables arranged at both sides of the band guiding plane and opposite each other. In this way, also comparatively long articles can be positioned and/or stacked in the region of the banding machine.

It is further favorable if the banding support has banding conveying devices arranged at both sides of the band guiding plane and opposite each other. In this way, comparatively long articles can equally be positioned and/or stacked in the region of the banding machine. An additional option for positioning is realized by means of said conveying devices. The conveying devices can therefore be used to position articles and subsequently transport the articles away from the banding machine. Furthermore, also a combination of the conveying devices and banding support tables is possible. For example, banding support tables can abut on the band guide immediately, whereas the conveying devices abut on the banding support tables somewhat more externally.

It is also favorable if the first conveying direction of the articles on the first conveying system is identical with the second conveying direction of the secured stack of articles on the second conveying system. This ensures that the articles are transported in a (single) main conveying direction, whereby the structure of the article bundling device, and in particular also of the picking system having the article bundling device, is simplified. It should generally be noted that the articles, despite being transported in a (single) main conveying direction, can locally also move in a different conveying direction inside the article bundling device (for example vertically downward). Inside the article bundling device, there may therefore also be differently oriented local conveying directions. The aforementioned equality condition may in particular also refer to a projection, viewed from the top, of the first and second conveying direction onto a horizontal plane.

It is additionally advantageous if the band guiding plane is inclined in relation to a vertical by a first angle of inclination away from the first conveying system such that a top intersecting line between the band guiding plane and the support plane and a bottom intersecting line between the band guiding plane and the discharging plane are arranged at a horizontal distance, wherein the bottom intersecting line is offset backward (in the first conveying direction) in relation to the top intersecting line. In other words, the band guiding plane with its top end is inclined in relation to a vertical in a direction located downstream and/or away from the first conveying system. In other words yet, the band guiding plane with its top end is inclined in relation to a first vertical plane aligned transverse to the first conveying direction in a direction located downstream and/or away from the first conveying system. The band guiding plane is therefore inclined such that an opening angle pointing to the first conveying system between the band guiding plane and the banding support opens further (increases) in relation to a vertical alignment of the band guiding plane. This further facilitates the positioning of the articles to be stacked and to be secured in the region of the banding machine. For the sake of completeness, it should be noted that the specified inclination of the band guiding plane may refer to a working position or operating position of the banding machine. If the band guiding plane is rigid, the inclination of same is simultaneously identical with the working position. Yet it would also be conceivable that the banding plane can be moved (pivoted) from a working position into an initial position in order to facilitate the access to components of the article bundling device, for example. In the initial position, the banding plane can equally be inclined, yet in particular also be aligned horizontally or vertically. In the working position, the band guiding plane is inclined in any case, according to this embodiment. In particular, the band guiding plane may be invariable, with regard to its inclination, during operation. This means that the band guiding plane may be rigid in its entirety, be invariable (rigid) during the operation, or vary its inclination even during operation (however, it will not assume a horizontal or vertical position during operation, according to this embodiment).

Furthermore, it is favorable if the bottom intersecting line extends between the first frame parts of the band guide. In other words, the band guide extends upward from the banding support. This enables the formation of particularly high stacks of articles.

It is further particularly advantageous if the banding support (i.e. its support plane) is inclined in relation to a horizontal plane by a second angle of inclination such that an end adjacent to the first conveying system is positioned higher than an end facing away from the first conveying system. In other words, the banding support with its end located downstream and/or with its end facing away from the first conveying system is inclined downward in relation to a horizontal plane. In particular, the banding support may be aligned at a right angle to the band guiding plane. In this way, a sliding of the articles into a position intended for stacking can be assisted.

It is further particularly advantageous if the discharging plane is inclined in relation to a horizontal plane by a third angle of inclination such that an end facing away from the banding machine is positioned higher than an end adjacent to the banding machine. In other words, the discharging plane with its end located downstream and/or with its end facing the banding machine is inclined downward in relation to a horizontal plane. In particular, the discharging plane may be aligned at a right angle to the band guiding plane. In this way, a sliding of the articles into a discharging position can be assisted.

Furthermore, it is favorable if the article bundling device has a stacking stop arranged in the region of the banding support downstream of the band guiding plane in the second conveying direction of the second conveying system, which stacking stop is movable by means of at least one drive between a release position withdrawn from the transport path and a stacking position protruding into the transport path, wherein the second conveying system forms the transport path along which the secured stack of articles is transported. This ensures that the articles moving in the region of the band guiding plane can be stopped selectively, whereby the stacking operation and the securing of the stack of articles with a band is facilitated. In particular, the stacking stop, prior to the step b), is moved into a stacking position protruding into the transport path of the articles and, prior to the step d), is moved into a release position withdrawn from the transport path.

It is particularly advantageous in the above context if
the stacking stop is aligned at a right angle to the banding support if, in the step b), articles of essentially the same size are stacked on the banding support, and/or
the stacking stop is aligned oblique to the banding support if, in the step b), articles of essentially different sizes and sorted according to their size are stacked on the banding support, wherein larger articles are arranged lower down in the stack of articles and smaller articles are arranged further up in the stack of articles.

This enables stacks to be formed which are inherently very stable even if the stacked articles vary in size. The stack therefore remains sightly for a long time even in unfavorable conditions.

It is also particularly advantageous if the articles comprise articles with a lower bending stiffness and articles with a higher bending stiffness and if, in the step b), (at least some of) the articles are discharged onto the stack of articles according to their bending stiffness, wherein the articles with higher bending stiffness are arranged at the bottom of the stack of articles. This is a further measure for forming inherently stable stacks even if the stacked articles have varied bending stiffness. The stacks therefore remain sightly for a long time even in unfavorable conditions.

It is particularly advantageous in addition if
the conveying device of the first conveying system comprises an article discharging device with an article discharging device support and an article discharging device bottom opening (in particular a trap door),
wherein the article discharging device bottom opening is closable with the article discharging device support, and
wherein a vertical line at the end of the article discharging device bottom opening located downstream leads through the band guiding plane before meeting the banding support.

In this variant embodiment, the article discharging device bottom opening is therefore positioned such that said line leads through the band guiding plane inclined in relation to the vertical. In other words, the articles discharged from the article discharging device drop vertically through the band guiding plane (which is inclined in relation to the vertical) before reaching the banding support. This enables the articles to be brought, by means of a simple vertical movement, into a position favorable for the stacking and securing. The operations in the article bundling device are therefore particularly easy to reproduce. Also in this case, the inclination of the band guiding plane may refer to its working position or operating position. What has been said further above is then to be analogously applied.

It is also favorable if the article discharging device support is mounted on a frame of the article bundling device so as to be rotatable about an axis normal in relation to the article discharging device support (in particular so as to be rotatable about a vertical axis). In this way, an orientation of (an) article(s) about said axis can be modified. For example, items of clothing can be stacked such that their top ends are respectively located on top of one another or such that a top end of an item of clothing will respectively be located on top of a bottom end of another item of clothing.

It is particularly favorable if a camera is arranged above the article discharging device support. In this way, the orientation of the articles in the article discharging device support can be captured.

It is favorable if the article discharging device support is movable by means of at least one drive between a release position withdrawn from the article discharging device bottom opening and a receiving position closing the article discharging device bottom opening, wherein the article discharging device support in the receiving position defines the discharging plane. This ensures that the article discharging device bottom opening can be opened and closed as and when needed. For example, the article discharging device support may comprise base parts which are pivotable in opposite directions about axes aligned transverse to the transport direction. The proposed measures make it in particular also conceivable to stack multiple articles on the article discharging device support, which will then be jointly dropped into the region of the banding machine. Yet, evidently, the articles can also be discharged onto the banding support individually. The proposed measures ensure that the operations in the region of the banding machine can easily be decoupled from the operations on the conveying system for transporting the articles to the banding machine.

In one advantageous embodiment of the method presented, the steps a) and b) comprise:
  i) the forwarding of at least one article via a feeding conveying device having a chute or a driven conveying device, and discharging of the at least one article onto an article discharging device support of an article discharging device comprising the conveying device of the first conveying system, wherein the article discharging device support
     is moved into a receiving position closing the article discharging device bottom opening when an article or multiple articles is/are to be received on the article discharging device support, and
     is moved into a release position withdrawn from the article discharging device bottom opening when an article or multiple articles is/are to be discharged from the article discharging device support,
  ii) moving the article discharging device support into the release position withdrawn from the article discharging device bottom opening comprising the article discharging device after an article or multiple articles has/have been discharged onto the article discharging device support in order to drop this/these article(s) onto the banding support, and
  iii) repeating of the steps i) and ii) if the stack of articles formed on the banding support is incomplete.

This ensures that the stack of articles can be formed in a particularly flexible manner. In particular, both individual articles and (partial) stacks of articles can be discharged onto the stack of articles on the banding support. Accordingly, the articles can be forwarded in a separated manner or in groups using the first conveying system and stacked to form a stack of articles.

It is further particularly favorable if, between the steps i) and ii), an alignment of the article(s) on the article discharging device support is detected with the help of a camera arranged above the article discharging device support and corrected by rotating the article discharging device support about an axis with normal alignment to the article discharging device support (in particular about a vertical axis) if the detected actual orientation of the article(s) is not identical with a target orientation of the article(s). The proposed measures ensure that an orientation of (an) article(s) can be captured and optionally modified, so that the articles can subsequently be stacked as desired. For example, items of clothing can, again, be stacked such that their top ends are respectively located on top of one another or such that a top end of an item of clothing will respectively be located on top of a bottom end of another item of clothing, and so on.

It is further favorable if the first conveying system additionally has a feeding conveying device arranged upstream of the article discharging device in the first conveying direction, wherein the feeding conveying device comprises a chute or a driven conveying device whose end located downstream is spaced in vertical direction apart from the article discharging device support moved into the receiving position, and arranged above same. In this way, the articles can easily be aligned to the end of the article discharging device located downstream (in particular to the end of the article discharging device support located downstream). The operations in the article bundling device are therefore particularly easy to reproduce.

It is also particularly advantageous if
the first conveying system comprises a feeding conveying device, which comprises a chute or a driven conveying device, and
the end of the feeding conveying device located downstream is spaced both vertically and horizontally apart from the bottom intersecting line between the band guiding plane and the support plane,
wherein there is at least one trajectory (in particular extending in a vertical plane parallel to the first conveying direction), which leads from the end of the feeding conveying device located downstream through the band guiding plane onto the banding support and a tangent of the at least one trajectory, at the starting point, coincides with the discharging plane (identical with a conveying plane) of the feeding conveying device.

Accordingly, the step a) of the method presented comprises:
the forwarding via a feeding conveying device comprising the first conveying system, wherein the feeding conveying device comprises a chute or a driven conveying device, and
the discharging of the article(s) at a velocity which has a horizontal component, wherein a trajectory followed by the article(s) leads through the band guiding plane before ending on the banding support.

In this variant embodiment, the articles to be stacked therefore do not fall downward in vertical direction but move along a trajectory, which leads from the end of the feeding conveying device located downstream and through the band guiding plane before ending on the banding support. The proposed measures ensure that the articles can be brought, once again, into a position favorable for the stacking and securing. In this case, the operations in the article bundling device are easy to reproduce, also in this variant embodiment. An article discharging device with an article discharging device support and with an article discharging device bottom opening which is closable with same is not required to that end. Because of the simplified procedure, the articles can be stacked particularly quickly.

In a favorable embodiment of the article bundling device,
the first angle of inclination is in a range of 15-40° (and in particular in a range of 20-30°), and/or
the second angle of inclination is in a range of 15-40° (and in particular in a range of 20-30°), and/or
the third angle of inclination is in a range of 15-40° (and in particular in a range of 20-30°).

These angles have proven particularly advantageous for conveying articles to the banding machine and/or positioning them in the region of the banding machine crease-free or with low tendency for crumpling up.

It is further favorable if
the feeding conveying device is inclined in relation to a horizontal plane in a range of 30-50° (and in particular in a range of 35-45°) such that an end facing away from the banding machine is positioned higher than an end adjacent to the banding machine.

In other words, the feeding conveying device with its end located downstream and/or with its end facing the banding machine is inclined downward in relation to a horizontal plane. In particular, the feeding conveying device may be aligned at a right angle to the band guiding plane. In this way, the articles can easily be aligned to the end of the article discharging device located downstream (in particular to the end of the article discharging device support located downstream) in a manner which is particularly easy to reproduce.

In a favorable embodiment of the picking system, the loading aids are formed by article containers (in particular by transport bags), and the supply conveying system comprises an overhead conveying device for the suspended transport of the article containers and at least one unloading station for unloading the article containers, wherein the unloading station is adjoined, upstream, to the first conveying system of the at least one article bundling device. This kind of conveyance is particularly well-suited for articles with low bending stiffness, such as items of clothing packed in plastic foil, for example. In combination with the article bundling device presented, this results in a particularly efficient system for stacking and securing articles.

It is particularly favorable in the above context if the overhead conveying device, for transporting the article container to the unloading station and for transporting the article container away from the unloading station, comprises transport carriers movable by means of a drive device or by means of gravity, wherein the article container is coupled, in an articulated manner, to the transport carrier via a suspended support, whereby the suspended support is pivotable relative to the transport carrier about an axis extending essentially parallel to the overhead conveying device. This enables the article containers to be emptied particularly swiftly and, at the same time, in a process-reliable manner.

It is further favorable if the picking system additionally comprises a packing machine for packing the secured stack of articles into a shipping package (e.g. polybag, cardboard box), wherein the packing machine is connected with the at least one article bundling device via a shipping conveying system, wherein the shipping conveying system is configured to transport the secured stacks of articles from the at least one article bundling device to the packing machine, and wherein the shipping conveying system adjoins the second conveying system of the at least one article bundling device. In this way, the stack of articles secured with a band and/or sleeve can be made ready to dispatch.

In a further favorable variant embodiment, the picking system comprises a first article bundling device and a second article bundling device.

In the first article bundling device,
the conveying device of the first conveying system comprises an article discharging device with an article discharging device support and an article discharging device bottom opening,
wherein the article discharging device bottom opening is closable with the article discharging device support, and
wherein a vertical line at the end of the article discharging device bottom opening located downstream leads through the band guiding plane before meeting the banding support.

In the second article bundling device,
the first conveying system comprises a feeding conveying device, which comprises a chute or a driven conveying device, and
the end of the feeding conveying device located downstream is spaced both vertically and horizontally apart from the bottom intersecting line between the band guiding plane and the support plane,
wherein there is at least one trajectory, which leads from the end of the feeding conveying device located downstream through the band guiding plane onto the banding support and a tangent of the at least one trajectory, at the starting point, coincides with the discharging plane of the feeding conveying device.

Advantageously, articles with lower bending stiffness are stacked and secured in the first article bundling device and articles with higher bending stiffness are stacked and secured in the second article bundling device. In this context, the advantage that articles with higher bending stiffness can be moved with high process reliability along a trajectory and therefore formed into a stack more quickly is made use of. In contrast, articles with lower bending stiffness, which could be moved with only low process reliability along a trajectory, are merely dropped vertically downward. Overall, this results in a particularly economical operation of the picking system presented.

Generally, it is of advantage if, prior to the step b), an underlay is arranged on the banding support, on which underlay the articles are stacked and which is equally encompassed by the band. In this way, the stack can be stabilized. The underlay may be made of cardboard or of a plastic, for example.

It is also favorable if, after the step b), a shipping document (for example a delivery note and/or an invoice) is arranged on the stack of articles, around which the band is equally guided. This ensures that shipping documents on which data from the articles of the stack is given form direct part of the stack of articles. A shipping document can therefore be identified in a particularly intuitive manner as pertaining to a stack of articles.

It should be noted in this context that the variants and advantages disclosed in relation to the picking system presented equally relate to the method presented, and vice versa.

BRIEF DESCRIPTION OF THE DRAWINGS

For the purpose of better understanding of the invention, it will be elucidated in more detail by means of the figures below.

These show in a respectively very simplified schematic representation.

DETAILED DESCRIPTION OF THE PREFERRED EMBODIMENTS

First of all, it is to be noted that, in the different embodiments described, equal parts are provided with equal reference numbers and/or equal component designations, where the disclosures filled into in the entire description may be analogously transferred to equal parts with equal reference numbers and/or equal component designations. Moreover, the specifications of location, such as at the top, at the bottom, at the side, chosen in the description refer to the directly described and depicted figure, and in case of a change of position, are to be analogously transferred to the new position.

Figure 1:
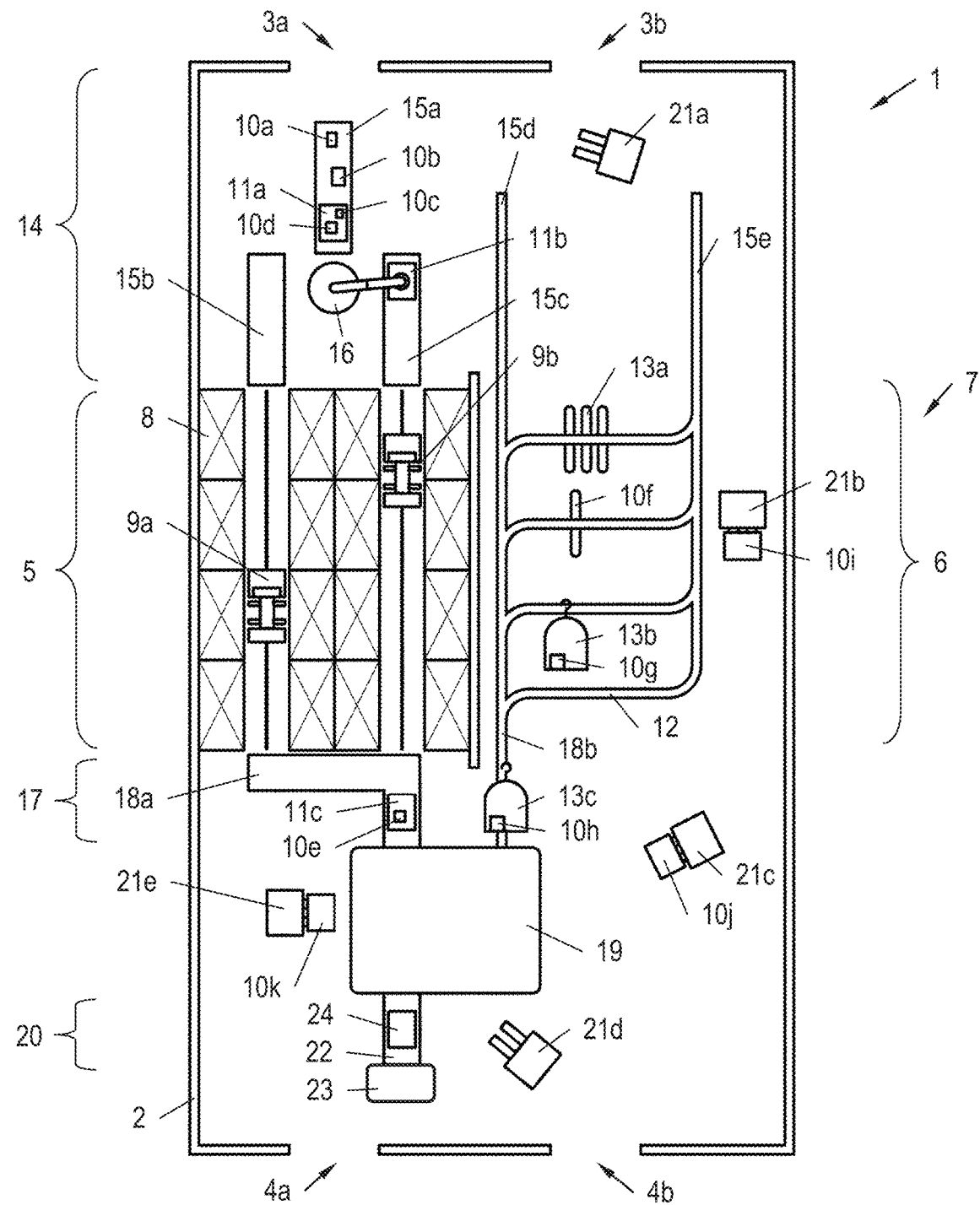
FIG. 1 a schematically represented picking system in a top view.

FIG. 1 shows an exemplary picking system 1, which comprises a building 2 which has article receiving areas 3a and 3b as well as article issue areas 4a and 4b. The picking system 1 further comprises a first storage region 5 and a second storage region 6, which, jointly, form part of the article store 7.

The first storage region 5 comprises storage racks 8 as well as storage and retrieval units 9a and 9b traveling between the storage racks 8. Articles 10a . . . 10e can be stored in the storage racks 8 directly or with the help of first transport loading aids 11a . . . 11c. In this case, the first transport loading aids 11a . . . 11c may in particular be configured as trays, cardboard boxes or containers with a fixed base and side walls.

The second storage region 6 comprises overhead storage conveyors 12, on which articles 10f . . . 10h can be stored directly or with the help of second transport loading aids 13a . . . 13c, in this case with the help of hanging bags 13a . . . 13c. If the articles 10f are stored directly on the overhead storage conveyors 12, the articles 10f have the form of hanging articles, i.e. the form of items of clothing, for example, which hang on clothes hooks. If the articles 10g . . . 10h are stored in the hanging bags 13a . . . 13c, these can have practically any form.

The picking system 1 further comprises a storage conveying system 14, which, in this example, has a first storage section 15a, a second storage section 15b and a third storage section 15c. The first storage section 15a connects the article receiving area 3a with a rearranging robot 16. The second storage section 15b and the third storage section 15c connect the rearranging robot 16 with the storage and retrieval units 9a and 9b. On the first storage section 15a, two articles 10a, 10b are transported without first transport loading aids 11a . . . 11c and two further articles 10c, 10d are transported with a first transport loading aid 11a.

At the end of the rack aisles which face the storage conveying system 14, a supply conveying system and/or retrieval conveying system 17 is provided which, in this example, has a first retrieval section 18a which connects, in terms of conveyance, the storage and retrieval units 9a and 9b with an article bundling device 19.

The storage conveying system 14 further comprises a fourth storage section 15d and a fifth storage section 15e which connect the article receiving area 3b with the second storage region 6.

At the end of the second storage region 6 which faces the storage conveying system 14, the supply conveying system 17 comprises a second retrieval section 18b which connects, in terms of conveyance, the overhead storage conveyors 12 with the article bundling device 19.

The picking system 1 also comprises a shipping conveying system 20, which has a dispatch section 22 in the example shown, which connects the article bundling device 19 with a packing machine 23 and on which a stack of articles 24 is conveyed.

Finally, the picking system 1 has some autonomous guided vehicles 21a . . . 21e, which can transport articles 10i . . . 10k from the article receiving area 3a to the storage and retrieval units 9a and 9b or articles 10i . . . 10k from the article receiving area 3b to the fourth storage section 15d or fifth storage section 15e and thus form a part of the storage conveying system 14, and/or can transport articles 10i . . . 10k from the storage and retrieval units 9a and 9b to the article bundling device 19 or articles 10i . . . 10k from the second retrieval section 18b to the article bundling device 19 and thus form a part of the supply conveying system 17, and/or can transport articles 10i . . . 10k from the article receiving area 3a or article receiving area 3b to the article bundling device 19 and thus form both a part of the storage conveying system 14 and the supply conveying system 17 (conveying of cross-docking articles), and/or can transport stacks of articles 24 from the article bundling device 19 to the packing machine 23 and thus form a part of the shipping conveying system 20.

It is also conceivable that the picking system 1 comprises a rearranging conveying system (not represented in FIG. 1) between the first storage region 5 and the second storage region 6, using which rearranging conveying system articles 10a . . . 10k can be rearranged between the two storage regions 5 and 6. In particular, articles 10a . . . 10k can be removed from a first transport loading aid 11a . . . 11c, for example a container, and reloaded into a second transport loading aid 13a . . . 13c, preferably a hanging bag, or vice versa. The rearranging conveying system may comprise stationary conveying system and/or autonomous guided vehicles 21a . . . 21e.

The functioning of the storage and picking system 1 depicted in FIG. 1 is as follows:

At the article receiving area 3a and/or article receiving area 3b, articles 10a . . . 10b are delivered and stored in the first storage region 5 and/or the second storage region 6. For storing in the first storage region 5, the articles 10a and 10b are laid directly onto the first storage section 15a of the storage conveying system 14, and/or articles 10c and 10d are laid onto said first storage section 15a with the help of a first transport loading aid 11a. The articles 10a . . . 10d are subsequently transported to the rearranging robot 16 and laid, by same, onto the second storage section 15b or the third storage section 15c. In a further step, the articles 10a . . . 10d are transported to the storage and retrieval units 9a and 9b with the help of the storage conveying system 14 and stored in the storage racks 8 by means of storage and retrieval units 9a and 9b.

When executing an order for picking articles, the assigned article(s) 10e is/are retrieved from the storage rack 8 with the help of the storage and retrieval unit 9a or 9b, handed over to the retrieval section 18a of the supply conveying system 17 and transported, on the retrieval section 18a, to the article bundling device 19.

In the article bundling device 19, the article(s) 10e is/are stacked and secured with a band and, in this example, conveyed to an optional packing machine 23. Subsequently, the stack of articles 24 packed in a plastic bag, for example, is transported to the article issue area 4a. The procedures in the article bundling device 19 are not represented in detail in FIG. 1 but are explained in detail in FIGS. 2 to 7, 8A and 8B below.

The procedure for storing, stocking, retrieving and order-picking of the articles 10f . . . 10h is similar to that for storing, stocking, retrieving and order-picking of the articles 10a . . . 10e.

(An) article(s) 10f can be transported, via the fourth storage section 15d or the fifth storage section 15e, on one of the overhead storage conveyors 12 of the second storage region 6 and stored there. In this case, the article(s) 10f can be transported on the overhead conveyors of the fourth storage section 15d or of the fifth storage section 15e and/or stored on the overhead storage conveyor 12 directly or with the help of a second transport loading aid 13a . . . 13c, such as this is represented in FIG. 1 for the articles 10g and 10h. The second transport loading aid 13a . . . 13c is configured as a hanging bag, in this example.

It should be noted in this context that the hanging bags 13b and 13c in FIG. 1 have been rotated into the plane of projection for the sake of better depictability. In reality, the hanging bags 13b and 13c hang downward, of course.

When executing an order for picking articles, the assigned article(s) 10h and/or the hanging bag 13c is/are transported, via the second retrieval section 18b of the supply conveying system 17, to the article bundling device 19. In the article bundling device 19, the article(s) 10h is/are stacked and secured with a band and, in this example, also transported to an optional packing machine 23. Subsequently, the packed stack of articles 24 is, once again, transported to the article issue area 4a.

The transport of the articles 10a . . . 10h may be done via stationary conveying system, such as this has been described above, or with the help of autonomous guided vehicles 21a . . . 21e, such as this is represented in FIG. 1. For example, (an) article(s) 10f . . . 10h can be transported from the article receiving area 3b to the fourth storage section 15d or the fifth storage section 15e with the help of an autonomous guided vehicle 21a. (An) article(s) 10k can also be transported from the first storage region 5 or from the second storage region 6 to the article bundling device 19 with the help of an autonomous guided vehicle 21e. It would also be conceivable that (an) article(s) 10i is/are transported directly from the article receiving area 3a or article receiving area 3b to the article bundling device 19 using an autonomous guided vehicle 21b (cross-docking article(s)). Finally, it is also conceivable that a stack of articles or a shipping package is transported from the article bundling device 19 to the article issue area 4a or article issue area 4b by a guided vehicle 21d. The articles 10i . . . 10k can be conveyed by the guided vehicles 21a . . . 21e without first transport loading aids 11a . . . 11c or without second transport loading aids 13a . . . 13c, as specified above, or also be conveyed using first transport loading aids 11a . . . 11c or using second transport loading aids 13a . . . 13c.

The picking system 1 therefore comprises a storage region 5, 6 and a supply conveying system 17 between the storage region 5, 6 and the at least one article bundling device 19, by means of which the articles 10a . . . 10p can be transported to the at least one article bundling device 19 using loading aids 11a . . . 11c, 13, 13a . . . 13c.

Figure 2:
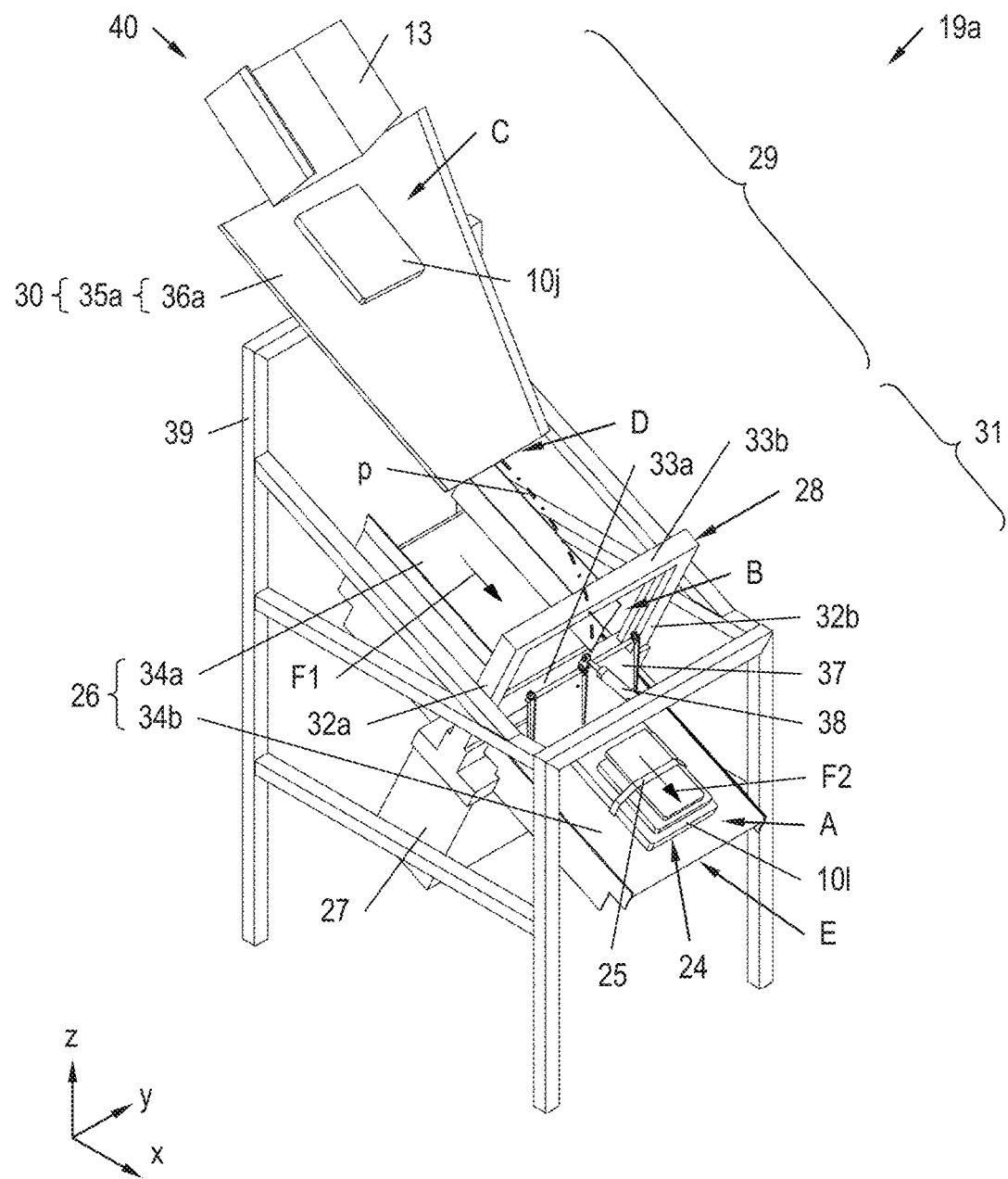
FIG. 2 a first exemplary embodiment of an article bundling device in an oblique view.

FIG. 2 shows an exemplary embodiment of the article bundling device 19a in a detailed view. This article bundling device 19a is connected, in terms of conveyance, with the article store 7 by means of the supply conveying system 17, as this is represented in FIG. 1, in order to enable the automatic transport of the articles 10*a* . . . 10*l* from the article store 7 to the article bundling device 19*a*. This article bundling device 19*a* is connected, in terms of conveyance, with the packing machine 23 also by means of the shipping conveying system 20, in order to enable the automatic transport of the stacked articles 10*a* . . . 10*l* from the article bundling device 19*a* to the packing machine 23. The shipping conveying system 20 is preferably an article issue conveying system operated in an automated manner. Same comprises a "stationary conveying system" and "guided vehicles operated in an automated manner," for example. Alternatively, the shipping conveying system 20 may (in part or in full) also be a manually operated article issue conveying system.

The article bundling device 19*a* shown in FIG. 2 for stacking articles 10*a* . . . 10*l* and for securing the stack of articles 24 with a band 25, comprises, in detail, a banding support 26 which defines a support plane A and on which the articles 10*a* . . . 10*l* are stackable, as well as an automatic banding machine 27 with a band guide 28 with which the band 25 is guided around the stack of articles 24 and which defines a band guiding plane B which intersects with the support plane A. In addition, the article bundling device 19*a* comprises a first conveying system 29 for transporting the articles 10*a* . . . 10*l* to the banding machine 27, arranged upstream of the banding machine 27 in a first conveying direction F1, which first conveying system 29 comprises a conveying device 30 which defines a discharging plane C and from which the articles 10*a* . . . 10*l* are discharged onto the banding support 26, and a second conveying system 31 for transporting the secured stack of articles 24 away from the banding machine 27, arranged downstream of the banding machine 27 in a second conveying direction F2. The conveying device 30 of the first conveying system 31 with its end D located downstream in the first conveying direction F1 is arranged spaced in vertical direction z apart from the banding support 26 and above the banding support 26. In detail, the discharging plane C of the conveying device 30 of the first conveying system 29 with its end D located downstream in the first conveying direction F1 is arranged spaced in vertical direction z apart from the support plane A of the banding support 26 and above the support plane A of the banding support 26. Specifically, in FIG. 2, (an) article(s) 10*j* is located on the conveying device 30 of the first conveying system 29, and a stack of articles 24 with multiple articles 10*l* is located on the banding support 26.

The method presented for stacking the articles 10*a* . . . 10*l* and for securing the stacked articles 10*a* . . . 10*l* with a band 25 wound around the stack of articles 24 comprises the steps:
a) forwarding the articles 10*a* . . . 10*l* for forming a stack of articles 24 using the first conveying system 29, which is arranged upstream of the banding machine 27 in the first conveying direction F1,
b) stacking these articles 10*a* . . . 10*l* to form a stack of articles 24 on the support plane A of the banding support 26,
c) applying the band 25 around this stack of articles 24 using the banding machine 27, and
d) discharging the stack of articles 24 secured with the band 25 via the second conveying system 31 arranged downstream of the banding machine 27 in the second conveying direction F2.

In this context, (an) article(s) 10*a* . . . 10*l* discharged from the conveying device 30 of the first conveying system 31 move(s) to the banding support 26 at least in sections of a trajectory without support of the article(s) from below (i.e. unsupported), wherein the movement has a vertical component pointing downward.

In the example represented in FIG. 2, the band guide 28 comprises first frame parts 32*a*, 32*b* protruding in relation to the banding support 26 and a second frame part 33*a* connecting same (at their bottom ends). The band guiding plane B extends between the first frame parts 32*a*, 32*b* and the second frame part 33*a*, and the band guide 28 is configured on the first frame parts 32*a*, 32*b* and the second frame part 33*a*.

In this example, the first frame parts 32*a*, 32*b* are connected, at their top ends, additionally by means of a further optional second frame part 33*b*. In other words, the band guide 28, in this example, is configured as a closed frame and guided annularly around the stack of articles 24. The band guide then assumes the form of a closed band guide frame. Generally, the top second frame part 33*b* may also not be provided. The band guide 28 is then configured as an open frame.

With the help of the band guide 28, the band 25 is guided around the stack of articles 24. Generally, the band guiding plane B can be considered as bounded by the band 25 to be wound around the stack of articles 24.

Figure 8A:
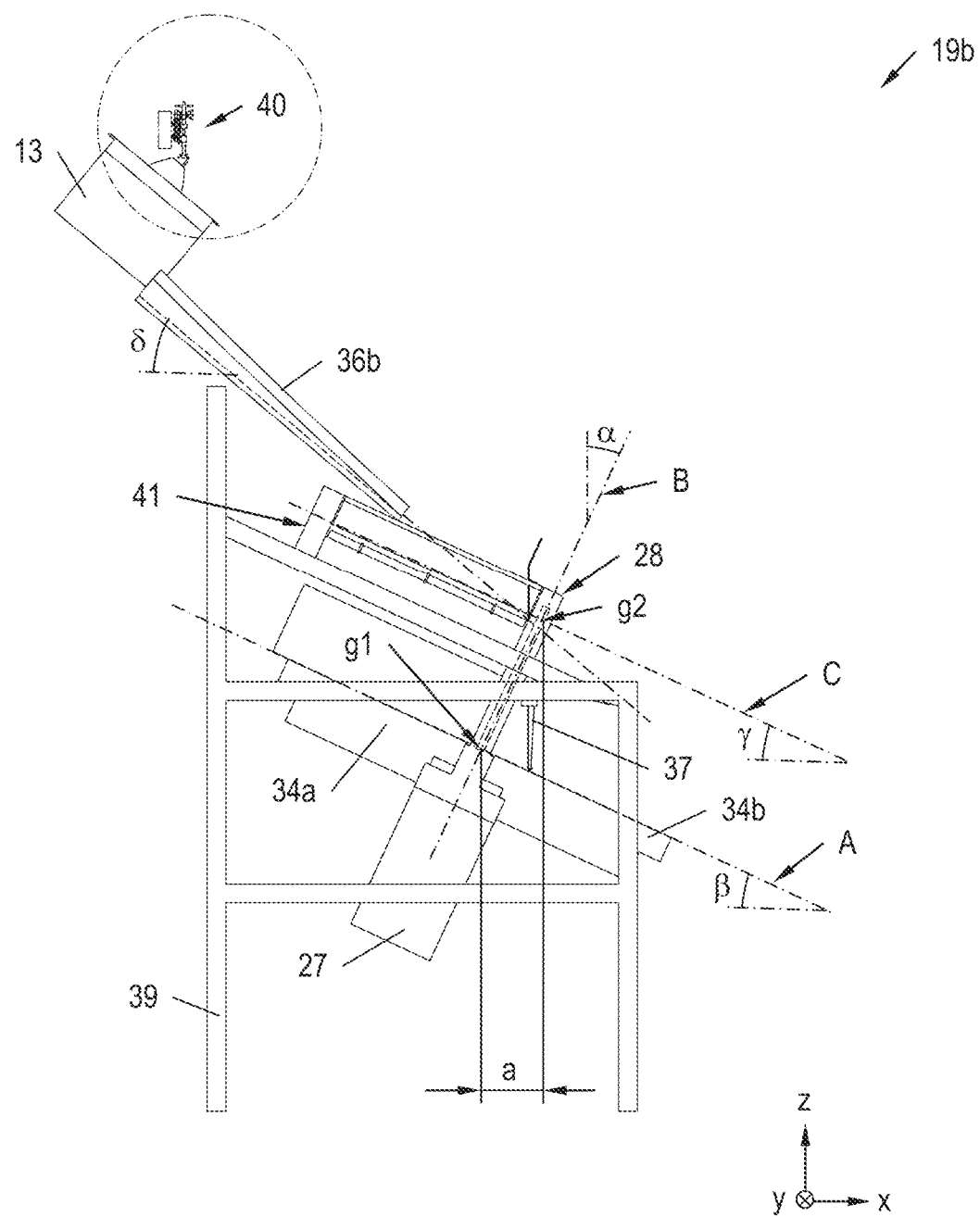
FIG. 8A the article bundling device from FIGS. 3 to 7 with a first embodiment of a banding support, in a side view.

In the embodiment represented in FIGS. 2 and 8A, the banding support 26 has banding support tables 34*a*, 34*b* arranged at both sides of the band guiding plane B and opposite each other. In this way, also comparatively long articles 10*a* . . . 10*l* can be positioned and/or stacked in the region of the banding machine 27.

Figure 8B:
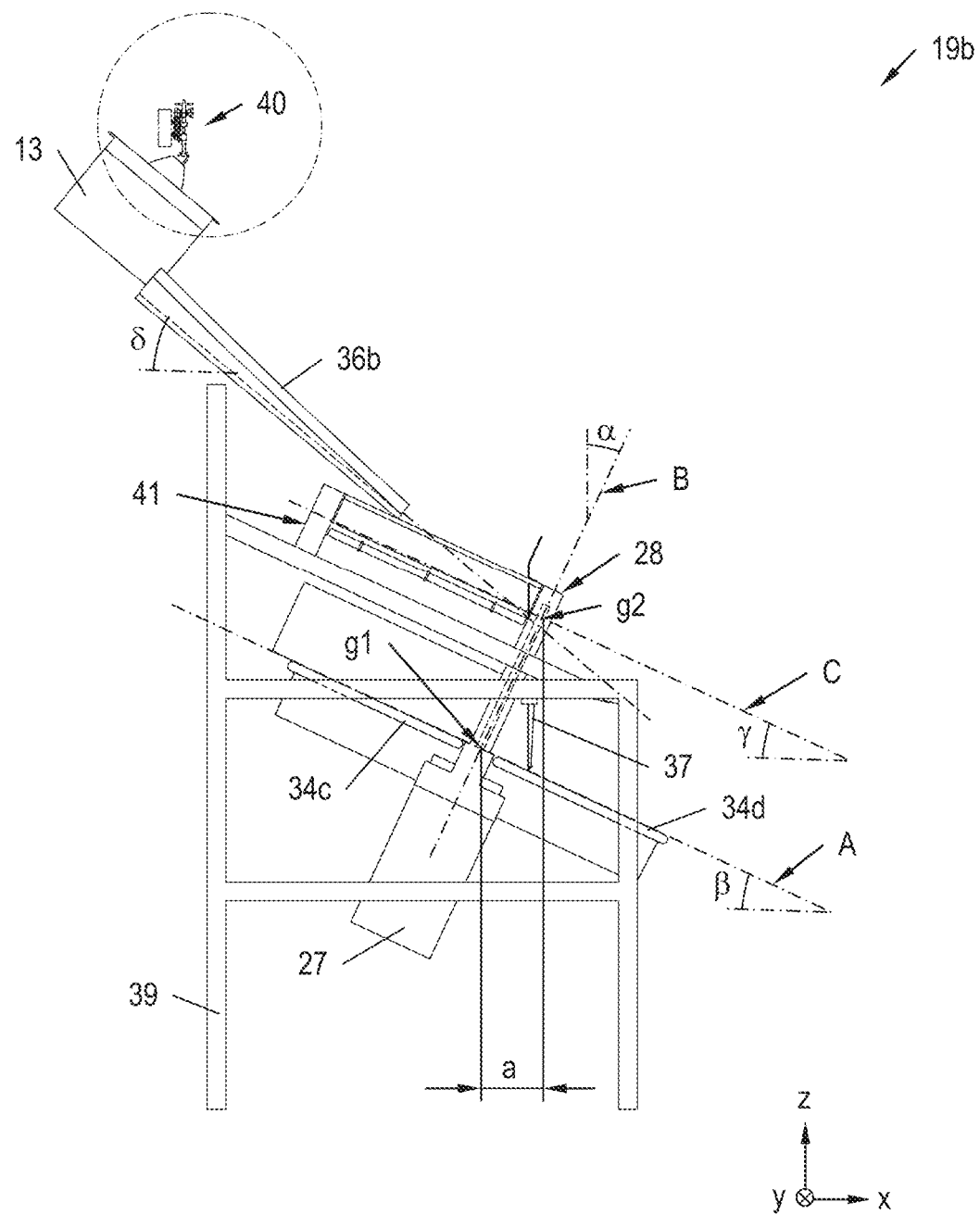
FIG. 8B the article bundling device from FIGS. 3 to 7 with a second embodiment of a banding support, in a side view.

In the embodiment represented in FIG. 8B, the banding support 26, alternatively to the banding support tables 34*a*, 34*b*, has banding conveying devices 34*c*, 34*d* arranged at both sides of the band guiding plane B and opposite each other.

It is not shown, but the banding support 26 may also comprise the banding support tables 34*a*, 34*b* and banding conveying devices 34*c*, 34*d*. For example, banding support tables 34*a*, 34*b* can abut on the band guide immediately 28, whereas the banding conveying devices 34*c*, 34*d* abut on the banding support tables 34*a*, 34*b* somewhat more externally.

The banding conveying devices 34*c*, 34*d* constitute a realization of an additional possibility for positioning and transporting the articles 10*a* . . . 10*l* away from the banding machine 27.

In the example shown in FIG. 2, the first conveying direction F1 of the articles 10*a* . . . 10*l* on the first conveying system 29 is identical with the second conveying direction F2 of the secured stack of articles 24 on the second conveying system 31. This ensures that the articles 10*a* . . . 10*l* are transported in a (single) main conveying direction, whereby the structure of the article bundling device 19*a*, and in particular also of the picking system 1, is simplified. It would also be conceivable, of course, that the first conveying direction F1 of the articles 10*a* . . . 10*l* on the first conveying system 29 and the second conveying direction F2 of the secured stack of articles 24 on the second conveying system 31 are different. For example, they may include an angle of 90° or 180° to each other.

It should generally be noted that the articles 10*a* . . . 10*l*, despite being transported in a (single) main conveying direction, can locally also move in a different conveying direction inside the article bundling device 19*a*. Inside the article bundling device 19*a*, there are therefore also differently oriented local conveying directions.

It is advantageous if the band guiding plane B is inclined with its top end in relation to a vertical z in a direction located downstream and/or away from the first conveying system 29, such as this is the case in FIG. 2. This further facilitates the positioning of the articles 10a . . . 10l to be stacked and to be secured in the region of the banding machine 27.

It is further advantageous if the banding support 26 with its end located downstream and/or with its end E facing away from the first conveying system 29 is inclined downward in relation to a horizontal plane x/y. In particular, the banding support 26 may be aligned at a right angle to the band guiding plane B. In this way, a sliding of the articles 10a . . . 10l into a position intended for stacking can be assisted.

It is advantageous, furthermore, if the discharging plane C with its end located downstream and/or with its end D facing the banding machine 27 is inclined downward in relation to a horizontal plane x/y. In particular, the discharging plane C may be aligned at a right angle to the band guiding plane B. In this way, a sliding of the articles 10a . . . 10l into a position intended for stacking can equally be assisted.

It should be noted in this context that more detailed specifications with regard to the inclination of the support plane A, of the band guiding plane B and of the discharging plane C are disclosed in the context of FIGS. 8A and 8B.

Furthermore, it is favorable if the article bundling device 19a has a stacking stop 37 arranged in the region of the banding support 26 downstream of the band guiding plane B in the second conveying direction F2 of the second conveying system 31, such as this is the case in the example represented in FIG. 2.

The stacking stop 37 is movable, by means of a drive 38 which is configured here as pneumatic or hydraulic cylinder by way of example, between a release position withdrawn from the transport path and a stacking position protruding into the transport path, wherein the second conveying system 31 forms the transport path along which the secured stack of articles 24 is transported. In particular, the stacking stop 37, prior to the step b), is moved into a stacking position protruding into the transport path of the articles 10a . . . 10l and, prior to the step d), is moved into a release position withdrawn from the transport path. This ensures that the articles 10a . . . 10l moving in the region of the band guiding plane B can be stopped selectively, whereby the stacking operation and the securing of the stack of articles 24 with a band 25 is facilitated.

It is particularly advantageous in the above context if
the stacking stop 37 is aligned at a right angle to the banding support 26 if, in the step b), articles 10a . . . 10l of essentially the same size are stacked on the banding support 26, and/or
the stacking stop 37 is aligned oblique to the banding support 26 if, in the step b), articles 10a . . . 10l of essentially different sizes and sorted according to their size are stacked on the banding support 26, wherein larger articles 10a . . . 10l are arranged lower down in the stack of articles 24 and smaller articles 10a . . . 10l are arranged further up in the stack of articles 24. This ensures that stacks of articles 24 can be formed which are inherently very stable even if the stacked articles 10a . . . 10l vary in size. The stack of articles 24 therefore remains sightly for a long time even in unfavorable conditions.

The modules mentioned above in the context of the article bundling device 19a are mounted on a frame 39. Yet this is but one of multiple possibilities, and said modules could also be assembled in another manner.

The loading aids are formed, in the example represented in FIG. 2, by article containers, in this case specifically by transport bags and/or hanging bags 13, 13a . . . 13c. The supply conveying system 17 is not only configured for the suspended transport of the article containers 13, 13a . . . 13c but also comprises an unloading station 40 for unloading the article containers 13, 13a . . . 13c. Here, the unloading station 40 is adjoined, upstream, to the first conveying system 29 of the at least one article bundling device 19a. A detailed description of the unloading station 40 is specified later in the context of FIG. 9.

It is provided that the discharging plane C of the conveying device 30 of the first conveying system 29 with its end D located downstream in the first conveying direction F1 is arranged spaced in vertical direction z apart from the support plane A of the banding support 26 and above the support plane A of the banding support 26.

Specifically, the first conveying system 29, in the example represented in FIG. 2, has a feeding conveying device 35a, which comprises a chute 36a whose end D located downstream is spaced both vertically and horizontally apart from the bottom intersecting line g1 between the support plane A and the band guiding plane B.

There is at least one trajectory p which extends in particular in a vertical plane x/z parallel to the first conveying direction F1 and which leads from the end of the feeding conveying device 35a located downstream through the band guiding plane B onto the banding support 26 and a tangent of the at least one trajectory, at the starting point, coincides with the discharging plane C of the feeding conveying device 35a.

Accordingly, the step a) of the method presented comprises:
the forwarding via the feeding conveying device 35a comprising the first conveying system 29, wherein the feeding conveying device 35a comprises a chute 36a in this example, and
the discharging of the article(s) at a velocity which has a horizontal component, wherein a trajectory p followed by the article(s) 10a . . . 10l leads through the band guiding plane B before ending on the banding support 26.

In this variant embodiment, the articles 10a . . . 10l therefore move along a trajectory p, which starts at the end of the feeding conveying device 35a located downstream and leads through the band guiding plane B before ending on the banding support 26. The proposed measures ensure that the articles 10a . . . 10l can be brought into a position favorable for the stacking and securing.

Instead of a chute 36a, also a driven conveying device, for example a roller conveyor or a conveyor belt, may generally be provided, whereby the initial velocity of the article(s) 10a . . . 10l can be predetermined in an even easier manner.

Yet the movement of the article(s) 10a . . . 10l along a trajectory p is not the only imaginable possibility for implementing the measures proposed according to the invention. Rather, it is also conceivable that
the conveying device 30 of the first conveying system 29 comprises an article discharging device 41 with an article discharging device support 42 and an article discharging device bottom opening 43,
wherein the article discharging device bottom opening 43 is closable with the article discharging device support 42, and
wherein a vertical line v at the end D of the article discharging device bottom opening 43 located downstream leads through the band guiding plane B before meeting the banding support 26,
such as this is the case in the example of an article bundling device 19b represented in FIGS. 3 to 7, 8A and 8B. In this variant embodiment, the article discharging device bottom opening 43 is therefore positioned such that said vertical line v leads through the band guiding plane B inclined in relation to the vertical z.

In other words, the articles 10a . . . 10l discharged from the article bundling device 19b drop vertically through the inclined band guiding plane B before reaching the banding support 26.

This ensures that the articles 10a . . . 10l can be brought, by means of a simple vertical movement, into a position favorable for the stacking and securing. The operations in the article bundling device 19b are therefore particularly easy to reproduce.

The article discharging device support 42, in the example represented in FIGS. 3 to 7, 8A and 8B, is movable by means of at least one drive between a release position withdrawn from the article discharging device bottom opening 43 and a receiving position closing the article discharging device bottom opening 43. In the receiving position, the article discharging device support 42 defines the discharging plane C. With the help of the drive, the article discharging device bottom opening 43 can be opened and closed as and when needed.

The proposed measures make it in particular also conceivable to stack multiple articles 10a . . . 10l on the article discharging device support 42, which will then be jointly dropped into the region of the banding machine 27. Yet, evidently, the articles 10a . . . 10l can also be discharged onto the banding support 26 individually. The proposed measures ensure that the operations in the region of the banding machine 27 can easily be decoupled from the operations on the conveying system for transporting the articles 10a . . . 10l to the banding machine 27.

The article discharging device support 42 may be configured as a trap door, for example, such as this is the case in the example represented in FIGS. 3 to 7, 8A and 8B. Yet also another design is generally conceivable, for example a configuration of the article discharging device support 42 as a roller shutter base.

It is favorable if a camera 44 is arranged above the article discharging device support 42. In this way, the orientation of the articles 10a . . . 10l in the article discharging device support 42 can be captured.

It is also favorable if the article discharging device support 42 is mounted on the frame 39 of the article bundling device 19b so as to be rotatable about an axis normal in relation to the article discharging device support 42, in particular so as to be rotatable about a vertical axis z. In this way, an orientation of (an) article(s) 10a . . . 10l about said axis can be modified. For example, items of clothing can be stacked such that their top ends are respectively located on top of one another or such that a top end of an item of clothing will respectively be located on top of a bottom end of another item of clothing.

In the example represented in FIGS. 3 to 7, 8A and 8B, the first conveying system 29 has a feeding conveying device 35b arranged upstream of the article discharging device 41 in the first conveying direction F1, which feeding conveying device 35b comprises a chute 36b, in this example, whose end G located downstream is spaced in vertical direction apart from the article discharging device support 42 moved into the receiving position, and arranged above same. In this way, the articles 10a . . . 10l can easily be aligned to the end D of the article discharging device 41 located downstream (in particular to the end D of the article discharging device support 42 located downstream). The operations in the article bundling device 19b are therefore particularly easy to reproduce.

Figure 3:
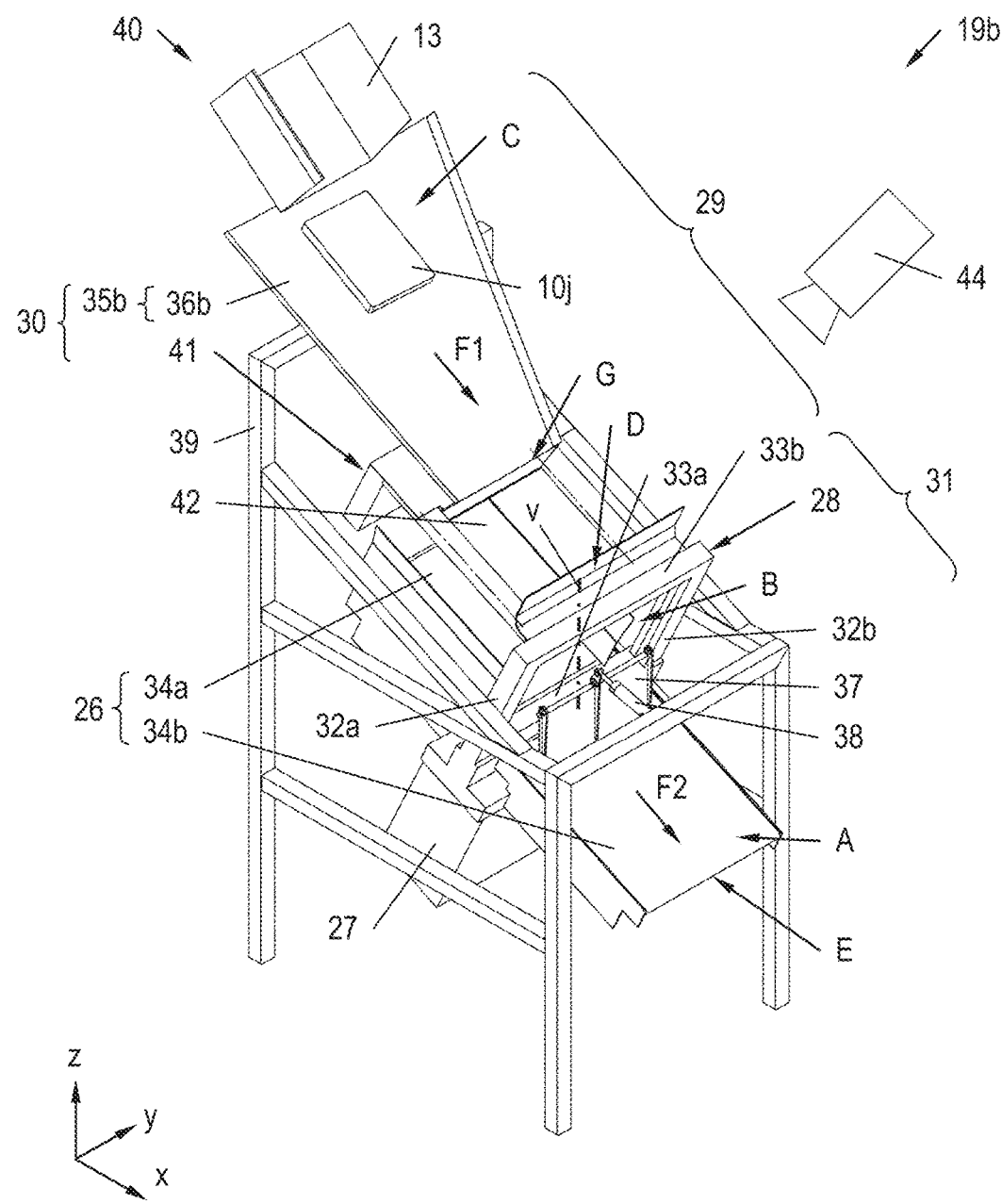
FIG. 3 a second exemplary embodiment of an article bundling device with closed article discharging device and (an) article(s) on the feeding device in an oblique view.

FIG. 3 shows the article bundling device 19b in a state in which the article(s) 10j is/are located on the chute 36b and is/are moving toward the closed article discharging device support 42 and/or the closed article discharging device bottom opening 43.

Figure 4:
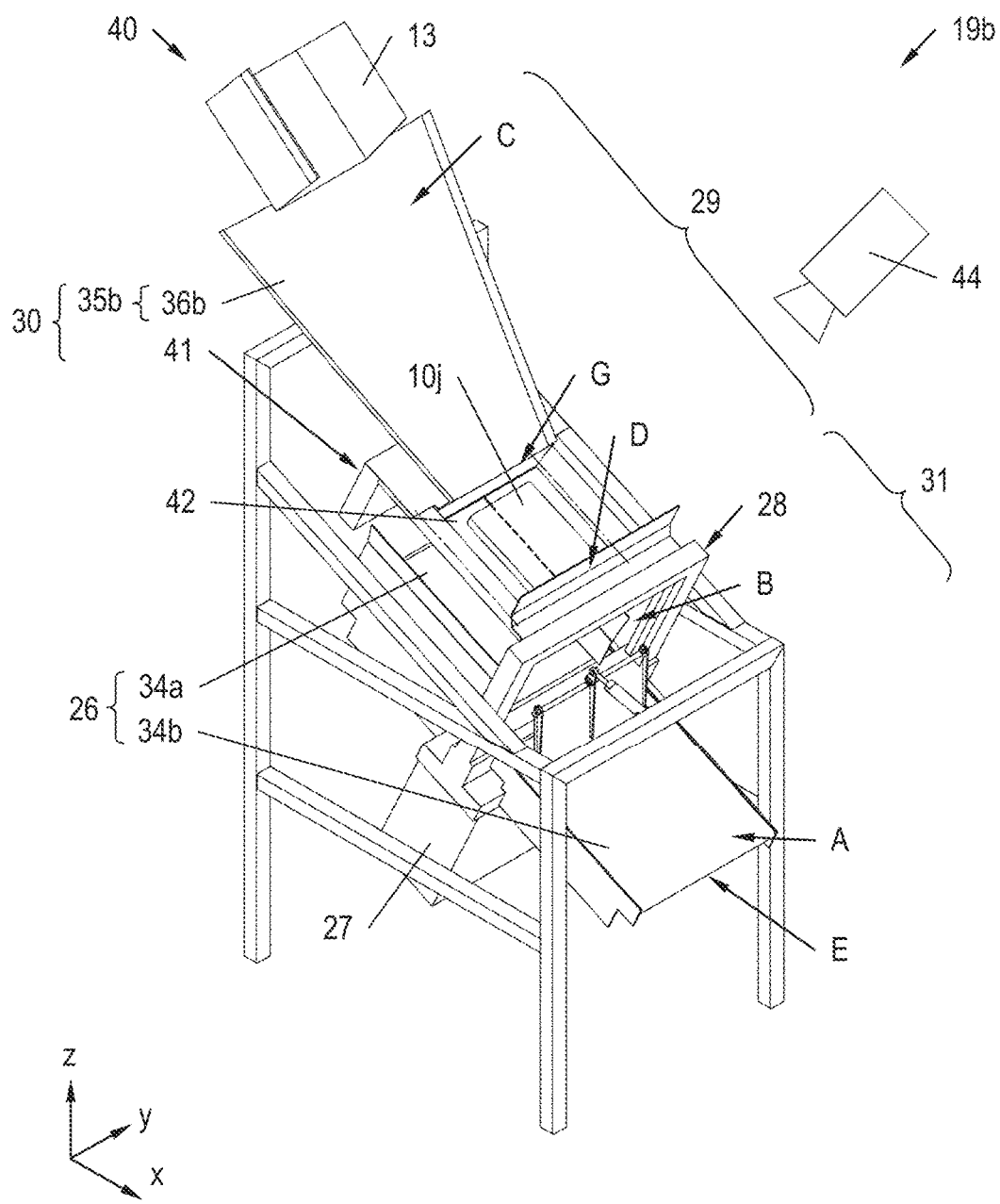
FIG. 4 like FIG. 3, but with the article(s) lying on the closed article discharging device.

FIG. 4 shows the article bundling device 19b in a state in which the article(s) 10j has/have reached the closed article discharging device support 42 and/or the closed article discharging device bottom opening 43 and has/have stopped on same.

Figure 5:
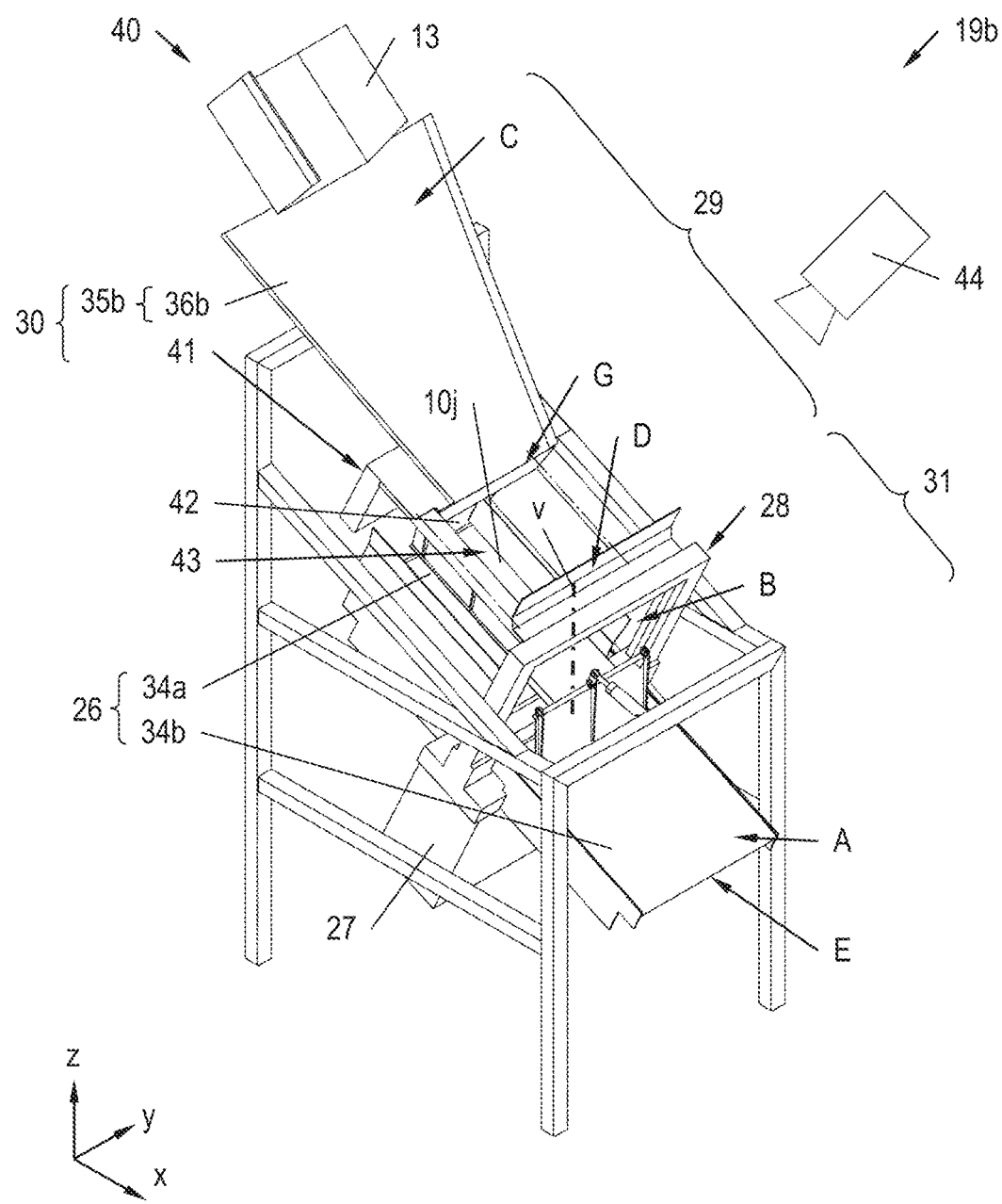
FIG. 5 like FIG. 3, but with the article(s) having fallen through the opened article discharging device and lying on the banding support.

FIG. 5 shows the article bundling device 19b in a state in which the article discharging device support 42 has been opened and the article(s) 10j has/have fallen through the article discharging device bottom opening 43 onto the banding support 26.

Figure 6:
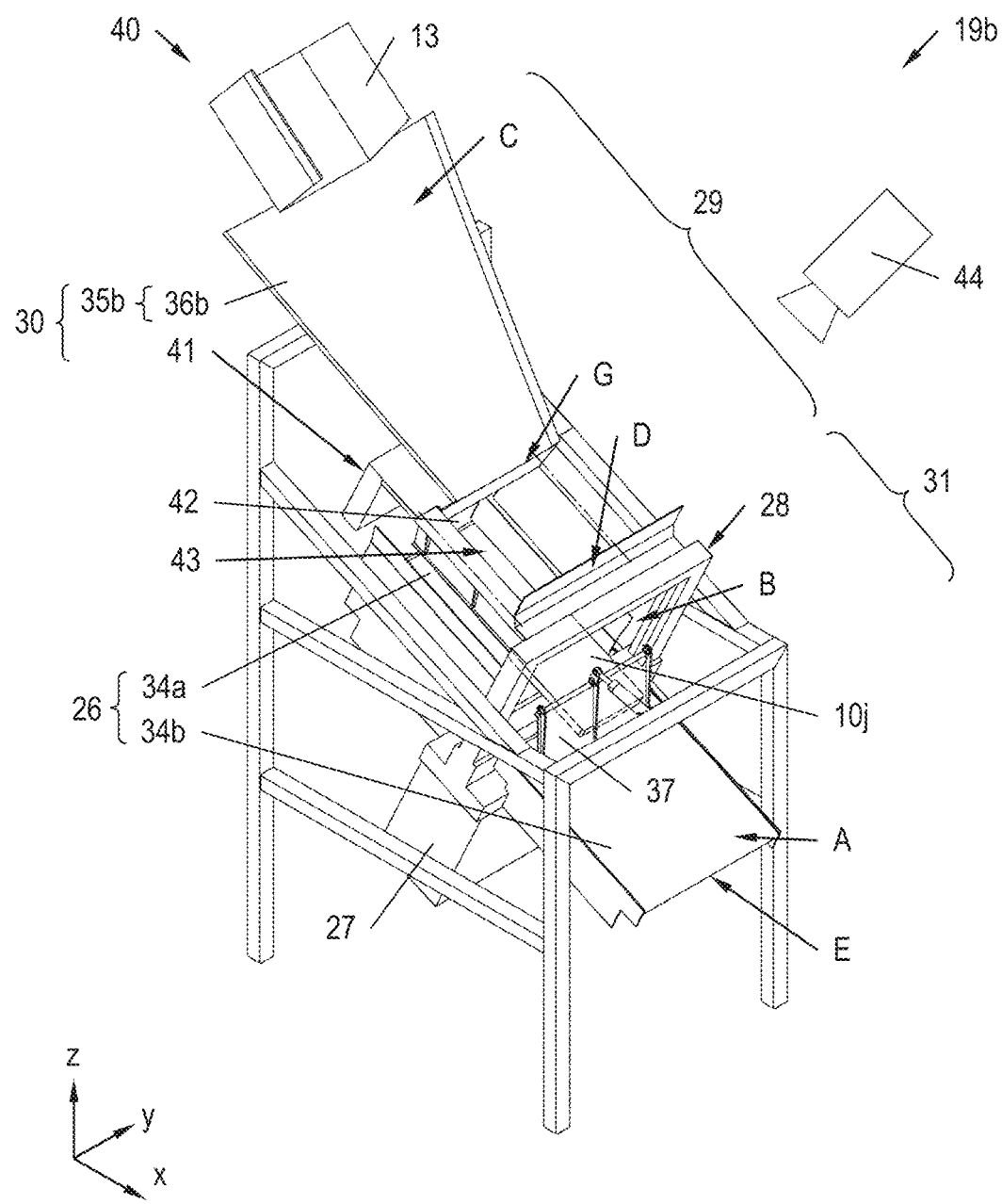
FIG. 6 like FIG. 3, but with the article(s) having slid up to the stacking stop.

FIG. 6 shows the article bundling device 19b in a state in which the article(s) 10j has/have slid onto the banding support 26 up to the stacking stop 37.

Figure 7:
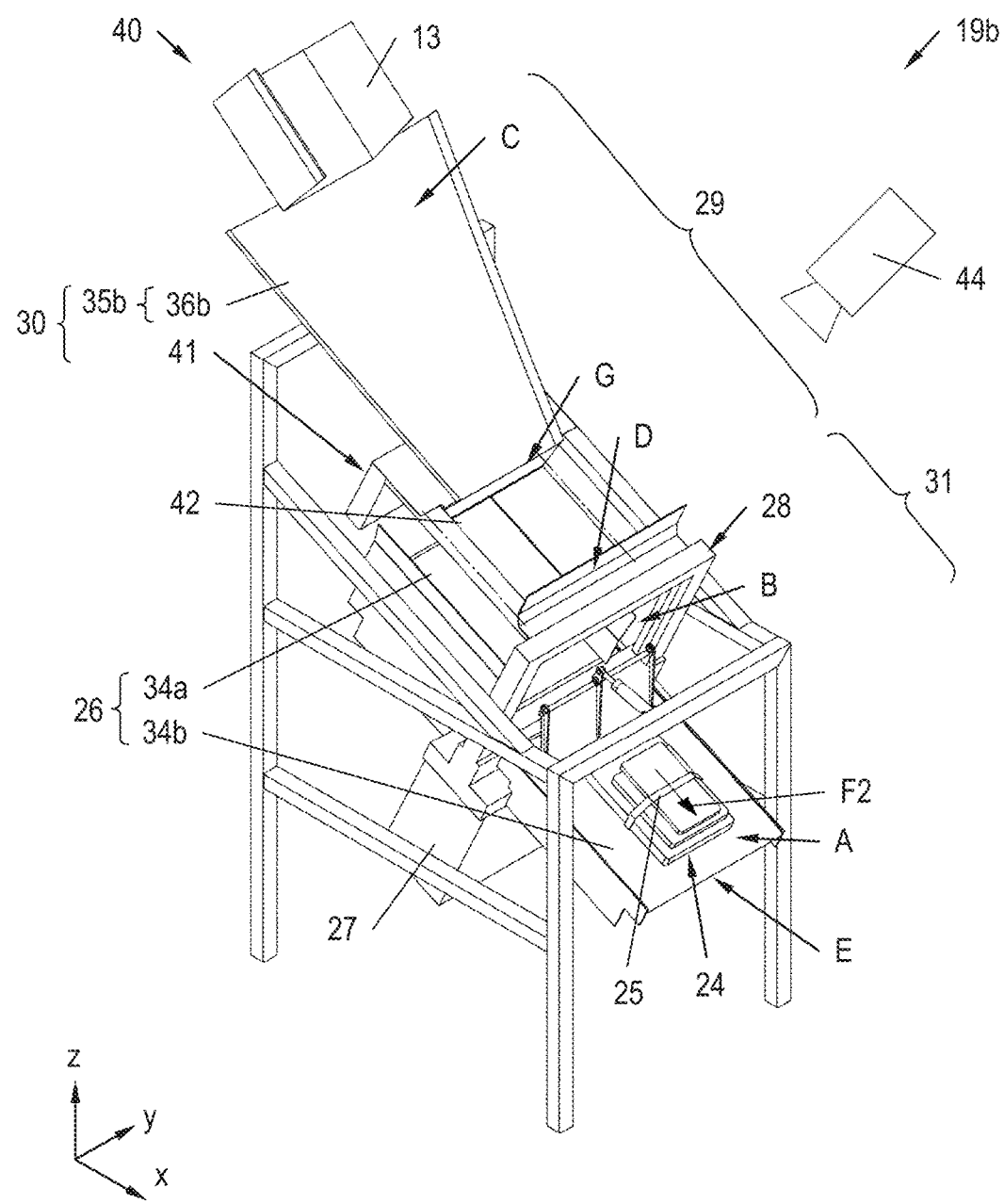
FIG. 7 like FIG. 3, but with a finished stack of articles on the banding support which stack of articles is secured with a band.

FIG. 7 finally shows the article bundling device 19b in a state in which multiple articles 10j have been stacked to form a stack of articles 24 and secured with a band 25, wherein the stack of articles 24 is located on the second conveying system 32.

In an advantageous embodiment of the method presented, the steps a) and b) comprise:
i) the forwarding of at least one article 10a . . . 10l via a feeding conveying device 35b comprising the first conveying system 29, wherein the feeding conveying device 35b, has a chute 36b in this example, and discharging of the at least one article 10a . . . 10l onto the article discharging device support 42 comprising the article discharging device 41 (see FIGS. 3 and 4), wherein the article discharging device support 42
is moved into a receiving position closing the article discharging device bottom opening 43 if an article 10a . . . 10l or multiple articles 10a . . . 10l is/are to be received on the article discharging device support 42,
is moved into a release position withdrawn from the article discharging device bottom opening 43 if an article 10a . . . 10l or multiple articles 10a . . . 10l is/are to be discharged from the article discharging device support 42,
ii) moving the article discharging device support 42 into the release position withdrawn from the article discharging device bottom opening comprising the article discharging device 41 after an article 10a . . . 10l or multiple articles 10a . . . 10l has/have been discharged onto the article discharging device support 42 in order to drop this/these article(s) 10a . . . 10l onto the banding support 26 (see FIG. 5), and
iii) repeating of the steps i) and ii) if the stack of articles 24 formed on the banding support 26 is incomplete.

This ensures that the stack of articles 24 can be formed in a particularly flexible manner. In particular, both individual articles 10a . . . 10l and (partial) stacks of articles can be discharged onto the stack of articles 24 on the banding support 26. Accordingly, the articles 10a . . . 10l can be forwarded in a separated manner or in groups using the first conveying system 29 and stacked to form a stack of articles 24.

It is further particularly favorable if, between the steps i) and ii), an alignment of the article(s) 10a . . . 10l on the article discharging device support 42 is detected with the help of the camera 44 arranged above the article discharging device support 42 and corrected by rotating the article discharging device support 42 about the axis with normal alignment to the article discharging device support 42 (in particular about the vertical axis z) if the detected actual orientation of the article(s) 10a . . . 10l is not identical with a target orientation of the article(s) 10a . . . 10l. The proposed measures ensure that an orientation of (an) article(s) 10a . . . 10l can be captured and optionally modified, so that the articles 10a . . . 10l can subsequently be stacked as desired. For example, items of clothing can, again, be stacked such that their top ends are respectively located on top of one another or such that a top end of an item of clothing will respectively be located on top of a bottom end of another item of clothing, and so on.

In the example represented in FIGS. 3 to 7, 8A and 8B, the feeding conveying device 35b has a chute 36b. Instead of a chute 36b, also a driven conveying device, for example a roller conveyor or a conveyor belt, may generally be provided, whereby the initial velocity of the article(s) 10a . . . 10l can be predetermined in an even easier manner.

FIGS. 8A and 8B show a simplified side view of the article bundling device 19b, and in particular the inclination of the support plane A, of the band guiding plane B and of the discharging plane C.

As has been mentioned, band guiding plane B with its top end is advantageously inclined in relation to a vertical z in a direction located downstream and/or away from the first conveying system 29. In other words, the band guiding plane B is advantageously inclined in relation to a vertical z by a first angle of inclination α away from the first conveying system such that a bottom intersecting line g1 between the support plane A and the band guiding plane B and a top intersecting line g2 between the discharging plane C and the band guiding plane B are arranged at a horizontal distance, wherein the bottom intersecting line g1 is offset backward (in the first conveying direction F1) in relation to the top intersecting line g2. In other words yet, the band guiding plane B with its top end is inclined in relation to a first vertical plane y/z aligned transverse to the first conveying direction F1 in a direction located downstream and/or away from the first conveying system 29. The band guiding plane B is therefore inclined such that an opening angle pointing to the first conveying system 29 between the band guiding plane B and the banding support 26 opens further (increases) in relation to a vertical alignment of the band guiding plane B. The first angle of inclination α is in particular in a range of 15-40° and in particular in a range of 20-30°.

As has been mentioned, it is also advantageous if the banding support 26 with its end located downstream and/or with its end E facing away from the first conveying system 29 is inclined downward in relation to a horizontal plane x/y. In other words, the banding support 26 (i.e. its support plane A) is inclined, in this case, in relation to a horizontal plane x/y by a second angle of inclination β such that an end adjacent to the first conveying system 29 is positioned higher than an end E facing away from the first conveying system 29. In particular, the banding support 26 may be aligned at a right angle to the band guiding plane B. The second angle of inclination β is in particular in a range of 15-40° and in particular in a range of 20-30°.

As has been mentioned, it is also of advantage if the discharging plane C with its end located downstream and/or with its end E facing the banding machine 27 is inclined downward in relation to a horizontal plane x/y. In other words, the discharging plane C is inclined, in this case, in relation to the horizontal plane x/y by a third angle of inclination γ such that an end facing away from the banding machine 27 is positioned higher than an end D adjacent to the banding machine 27. In particular, the discharging plane C may be aligned at a right angle to the band guiding plane B. The third angle of inclination γ is in particular in a range of 15-40° and in particular in a range of 20-30°.

It is also favorable if the feeding conveying device 36b is inclined in relation to a horizontal plane x/y in a range of δ=30-50°, and in particular in a range of δ=35-45°, such that an end facing away from the banding machine 27 is positioned higher than an end G adjacent to the banding machine 27. In other words, the feeding conveying device 35b with its end located downstream and/or with its end facing the banding machine 27 is inclined downward in relation to a horizontal plane x/y. In particular, the feeding conveying device 35b may be aligned at a right angle to the band guiding plane B.

In the examples represented in FIGS. 2 to 7, 8A and 8B, the loading aids are formed by transport bags and/or by hanging bags 13, 13a . . . 13c. Yet this is not a mandatory requirement for the article bundling devices 19a, 19b presented. Rather, it is also conceivable that the loading aids are of different design and are formed by first transport loading aids 11a . . . 11c, for example. In this case, the first transport loading aids 11a . . . 11c can also be transported standing upright. The supply conveying system 17 comprises, also in this case, an unloading station 40 for unloading the article containers 11a . . . 11c, wherein the unloading station 40 is adjoined, upstream, to the first conveying system 29 of the article bundling device 19a, 19b. The supply conveying system 17 is configured for transporting the article container 11a . . . 11c to the unloading station 40 and transporting the article container 11a . . . 11c away from the unloading station 40 by means of a driving device or by means of gravity.

Figure 9:
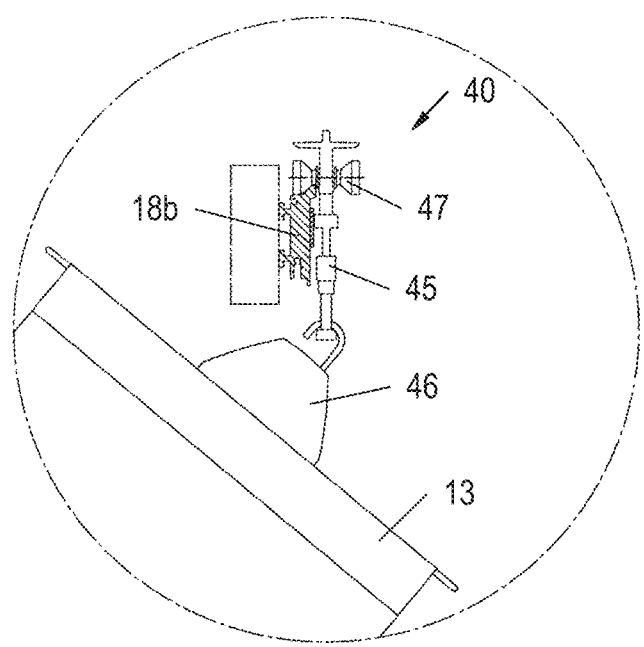
FIG. 9 an unloading station in a front view.

FIG. 9 shows an exemplary unloading station 40. A possible embodiment of such an unloading station 40 is described in AT 520 517 B1. Specifically, the overhead conveying device comprises, in this case, the second retrieval section 18b, also represented in FIG. 1, for transporting the article containers 13, 13a . . . 13c to the unloading station 40 and for transporting the article containers 13, 13a . . . 13c away from the unloading station 40 by means of a driving device or by means of transport carriers 45 movable by means of gravity. In this context, an article container 13, 13a . . . 13c is coupled, in an articulated manner, to the transport carriers 45 via a suspended support 46, whereby the suspended support 46 is pivotable relative to the transport carrier 46 about an axis extending essentially parallel to the overhead conveying device. For the movement of the transport carriers 45 via the support rail of the retrieval section 18b, rollers 47 are mounted in the transport carriers 45 so as to be rotatable, which rollers 47 roll on the support rail of the retrieval section 18b.

Generally, it is of advantage if, prior to the step b), an underlay is arranged on the banding support 26, on which underlay the articles 10a . . . 10l are stacked and which is equally encompassed by the band 25. In this way, the stack of articles 24 can be stabilized. The underlay may be made of cardboard or of a plastic, for example.

It is generally also particularly advantageous if the articles 10c, in the step b), are discharged onto the stack of articles 24 according to their bending stiffness, wherein the articles 10a . . . 10l with higher bending stiffness are arranged at the bottom of the stack of articles 24. This is an alternative or additional measure for forming inherently stable stacks of articles 24.

It is also of particular advantage if a first article bundling device 19b, such as it is represented in FIGS. 3 to 7, 8A and 8B, and a second article bundling device 19a, such as it is represented in FIG. 2, are adjoined to the supply conveying system of the picking system 1. Advantageously, articles 10a . . . 10l with lower bending stiffness are stacked and secured in the first article bundling device 19b and articles 10a . . . 10l with higher bending stiffness are stacked and secured in the second article bundling device 19a. In this context, the advantage that articles 10a . . . 10l with higher bending stiffness can be moved with high process reliability along a trajectory p and therefore formed into a stack of articles 24 more quickly is made use of. In contrast, articles 10a . . . 10l with lower bending stiffness, which could be moved with only low process reliability along a trajectory p, are merely dropped vertically downward. Overall, this results in a particularly economical operation of the picking system 1 presented.

It is also favorable if, after the step b), a shipping document (for example a delivery note and/or an invoice) is arranged on the stack of articles 24, around which the band 25 is equally guided. This ensures that shipping documents on which data from the articles 10a . . . 10l of the stack of articles 24 is given form direct part of the stack of articles 24. A shipping document can therefore be identified in a particularly intuitive manner as pertaining to a stack of articles 24.

It should be noted in this context that an optional packing machine 23 is provided in the picking system 1 represented in FIG. 1. The packing machine 23 serves the packing of the secured stack of articles 24 into a shipping package (e.g. polybag, cardboard box) and is connected with the at least one article bundling device 19a, 19b via the shipping conveying system 20, by means of which shipping conveying system 20 the secured stacks of articles 24 are transported from the at least one article bundling device 19a, 19b to the packing machine 23, wherein the shipping conveying system 20 adjoins the second conveying system 31 of the at least one article bundling device 19a, 19b. In this way, the stack of articles 24 secured with a band 25 and/or sleeve can be made ready to dispatch. Of course, it is also conceivable that the (unpacked) stacks of articles 24 are dispatched directly, without being further packed by a packing machine 23.

Finally, it should be noted that the scope of protection is determined by the claims. However, the description and the drawings are to be adduced for construing the claims. Individual features or feature combinations from the different exemplary embodiments shown and described may represent independent inventive solutions. The object underlying the independent inventive solutions may be gathered from the description.

In particular, it should also be noted that, in reality, the depicted devices can also comprise more, or also fewer, components than depicted. In some cases, the shown devices and/or their components may not be depicted to scale and/or be enlarged and/or reduced in size.

LIST OF REFERENCE NUMBERS 1 picking system
2 building
3a, 3b article receiving area
4a, 4b article issue area
5 first storage region
6 second storage region
7 article store
8 storage rack
9a, 9b storage and retrieval unit
10a . . . 10l article(s)
11a . . . 11c first transport loading aid
12 overhead storage conveyor
13, 13a . . . 13c second transport loading aid/hanging bag
14 storage conveying system
15a . . . 15e storage section
16 rearranging robot
17 supply conveying system
18a retrieval section
19, 19a, 19b article bundling device
20 shipping conveying system
21, 21a . . . 21e autonomous guided vehicle
22 dispatch section
23 packing machine
24 stack of articles
25 band
26 banding support
27 banding machine
28 band guide
29 first conveying system
30 conveying device
31 second conveying system
32a, 32b first frame part
33a, 33b second frame part
34a, 34b banding support table
34c, 34d banding conveying device
35a, 35b feeding conveying device
36a, 36b chute
37 stacking stop
38 stacking stop drive
39 frame
40 unloading station
41 article discharging device
42 article discharging device support
43 article discharging device bottom opening
44 camera
45 transport carrier
46 suspended support
47 roller
A support plane
B band guiding plane
C discharging plane
D conveying device/discharging plane end located downstream
E banding support end located downstream
F1, F2 conveying direction
G feeding conveying device end located downstream
a intersecting line horizontal distance
g1 bottom intersecting line
g2 top intersecting line
p trajectory
v vertical line
x first horizontal direction
y second horizontal direction
z vertical direction
α first angle of inclination
β second angle of inclination
γ third angle of inclination
δ fourth angle of inclination

The invention claimed is:

1. A picking system comprising:
   (a) a storage region;
   (b) a first article bundling device for stacking articles and securing the stack of articles with a band;
   (c) a supply conveying system arranged between the storage region and the first article bundling device, and configured to transport articles to the first article bundling device using loading aids; and
   (d) a packing machine;
   wherein the first article bundling device comprises:
     a banding support which defines a support plane and on which the articles are stackable,
     an automatic banding machine with a band guide, with which the band is guided around the stack of articles to form a secured stack of articles and which defines a band guiding plane which intersects with the support plane,
     a first conveying system for transporting the articles to the banding machine, arranged upstream of the banding machine in a first conveying direction, and comprising a conveying device for discharging the articles onto the banding support, wherein the conveying device defines a discharging plane arranged with an end located downstream in the first conveying direction spaced in vertical direction apart from the banding support and above the banding support, and
     a second conveying system for transporting the secured stack of articles away from the banding machine, arranged downstream of the banding machine in a second conveying direction,
     wherein the first conveying direction of the articles on the first conveying system is identical with the second conveying direction of the secured stack of articles on the second conveying system;
   wherein the packing machine is configured for packing the secured stack of articles into a shipping package,
   wherein the packing machine is connected with the first article bundling device via a shipping conveying system, the shipping conveying system being adjoined to the second conveying system of the first article bundling device, and
   wherein the secured stack of articles is transported from the first article bundling device to the packing machine by means of the shipping conveying system.

2. The picking system according to claim 1, wherein the band guide comprises first frame parts protruding in relation to the banding support and a second frame part connecting the first frame parts, wherein the band guiding plane extends between the first frame parts and the second frame part and wherein the band guide is formed on the first frame parts and the second frame part.

3. The picking system according to claim 1,
   wherein the banding support has banding support tables, and
   wherein a first banding support table of the banding support tables is arranged at a first side of the band guiding plane and a second banding support table of the banding support tables is arranged at a second side of the band guiding plane opposite the first banding support table.

4. The picking system according to claim 1,
   wherein the first conveying system is arranged at a first side of the band guiding plane and the second conveying system is arranged at a second side of the band guiding plane opposite the first conveying system.

5. The picking system according to claim 1, wherein the band guiding plane is inclined in relation to a vertical by a first angle of inclination away from the first conveying system such that a bottom intersecting line between the band guiding plane and the support plane and a top intersecting line between the band guiding plane and the discharging plane are arranged at a horizontal distance, wherein the bottom intersecting line is offset backward in relation to the top intersecting line.

6. The picking system according to claim 5, wherein the bottom intersecting line extends between the first frame parts of the band guide.

7. The picking system according to claim 5,
   wherein the conveying device comprises an article discharging device having an article discharging device support and an article discharging device bottom opening,
   wherein the article discharging device bottom opening is closable with the article discharging device support, and
   wherein a vertical line at the end of the article discharging device bottom opening located downstream leads through the band guiding plane before meeting the banding support.

8. The picking system according to claim 7, wherein the article discharging device support is mounted on a frame of the first article bundling device so as to be rotatable about an axis normal in relation to the article discharging device support.

9. The picking system according to claim 7, wherein a camera is arranged above the article discharging device support.

10. The picking system according to claim 7, wherein the article discharging device support is movable by means of at least one drive between a release position withdrawn from the article discharging device bottom opening and a receiving position closing the article discharging device bottom opening, and wherein the article discharging device support in the receiving position defines the discharging plane.

11. The picking system according to claim 7, wherein the first conveying system further comprises:
    a feeding conveying device arranged upstream of the article discharging device in the first conveying direction,
    wherein the feeding conveying device has a chute or a driven conveying device, and an end of the feeding conveying device located downstream is spaced in vertical direction apart from the article discharging device support moved into the receiving position, and arranged above same.

12. The picking system according to claim 11, wherein the feeding conveying device is inclined in relation to a horizontal plane in a range of 30-50° such that an end facing away from the banding machine is positioned higher than an end adjacent to the banding machine.

13. The picking system according to claim 5, wherein the first conveying system further comprises:
    a feeding conveying device having a chute or a driven conveying device,
    wherein an end of the feeding conveying device located downstream is spaced both vertically and horizontally apart from the bottom intersecting line between the band guiding plane and the support plane, and
    wherein there is at least one trajectory leading from the end of the feeding conveying device located downstream through the band guiding plane onto the banding support and a tangent of the at least one trajectory, at the starting point, coincides with the discharging plane of the feeding conveying device.

14. The picking system according to claim 5, wherein the first angle of inclination is in a range of 15-40°.

15. The picking system according to claim 1, wherein the banding support is inclined in relation to a horizontal plane by a second angle of inclination such that an end adjacent to the first conveying system is positioned higher than an end facing away from the first conveying system.

16. The picking system according to claim 15, wherein the second angle of inclination is in a range of 15-40°.

17. The picking system according to claim 1, wherein the discharging plane is inclined in relation to a horizontal plane by a third angle of inclination such that an end facing away from the banding machine is positioned higher than an end adjacent to the banding machine.

18. The picking system according to claim 17, wherein the third angle of inclination is in a range of 15-40°.

19. The picking system according to claim 1, wherein the first article bundling device further comprises:
    a stacking stop arranged in the region of the banding support downstream of the band guiding plane in the second conveying direction of the second conveying system,
    wherein the stacking stop is movable by means of at least one drive between a release position withdrawn from the transport path and a stacking position protruding into the transport path, wherein the second conveying system forms the transport path along which the secured stack of articles is transported.

20. The picking system according to claim 1, wherein
    the loading aids comprise article containers, and
    the supply conveying system comprises an overhead conveying device for the suspended transport of the article containers and at least one unloading station for unloading the article containers, wherein the unloading station is arranged upstream of the first conveying system and is adjoined to the first conveying system.

21. The picking system according to claim 20, wherein the overhead conveying device comprises:
    transport carriers for transporting the article containers to the unloading station and transporting the article containers away from the unloading station,
    wherein the transport carriers are movable by means of a driving device or by means of gravity,
    wherein an article container is coupled, in an articulated manner, to a transport carrier via a suspended support, whereby the suspended support is pivotable relative to the transport carrier about an axis extending essentially parallel to the overhead conveying device.

22. The picking system according to claim 1, further comprising a second article bundling device, wherein both the first article bundling device and the second article bundling device are adjoined to the supply conveying system, wherein articles with lower bending stiffness are stacked and secured in the first article bundling device and articles with higher bending stiffness are stacked and secured in the second article bundling device.

23. A method for stacking articles and for securing the stacked articles with a band wound around the stack of articles in an article bundling device,
    wherein the article bundling device comprises:
        a banding support defining a support plane, and
        an automatic banding machine with a band guide that guides the band around the stack of articles and defines a band guiding plane intersecting with the support plane along a bottom intersecting line,
        a first conveying system arranged upstream of the automatic banding machine in a first conveying direction and comprising a conveying device having a chute or a driven conveying device, and
        a second conveying system arranged downstream of the banding machine in a second conveying direction,
    the method comprising the steps:
        a) forwarding the articles for forming a stack of articles using the conveying device, wherein an article is discharged from the conveying device such that the article describes a trajectory which passes the band guiding plane before ending on the banding support and the article is moved to the banding support at least in sections of the trajectory without support of the article from below and the movement has a vertical component pointing downward,
        b) stacking the articles to form a stack of articles on the support plane of the banding support, wherein the articles are stacked on the bottom intersecting line,
        c) applying a band around this stack of articles using the banding machine,
        d) discharging the stack secured with the band via the second conveying system, and
        e) transporting the secured stack of articles from the article bundling device to a packing machine for packing the secured stack of articles into a shipping package, wherein the packing machine is connected with the article bundling device via a shipping conveying system adjoining the second conveying system.

24. The method according to claim 23, wherein the steps a) and b) comprise:
    i) forwarding of at least one article via a feeding conveying device comprising the first conveying system, the feeding conveying device having a chute or a driven conveying device, and discharging of the at least one article onto an article discharging device support of an article discharging device comprising the conveying device of the first conveying system, wherein the article discharging device support
        is moved into a receiving position closing an article discharging device bottom opening comprising the article discharging device, wherein in the receiving position one or multiple articles are received on the article discharging device support, and
        is moved into a release position withdrawn from the article discharging device bottom opening comprising the article discharging device, wherein in the release position one or multiple articles are discharged from the article discharging device support,
    ii) moving the article discharging device support into a release position withdrawn from the article discharging device bottom opening comprising the article discharging device, after one or multiple articles have been discharged onto the article discharging device support in order to drop the one or multiple articles onto the banding support, and
    iii) repeating of the steps i) and ii) if the stack of articles formed on the banding support is incomplete.

25. The method according to claim 24, wherein the one or multiple articles discharged from the article discharging device drop vertically through the band guiding plane before reaching the banding support.

26. The method according to claim 24, wherein, between the steps i) and ii), the method further comprises:
- detecting of an alignment of the one or multiple articles on the article discharging device support by a camera arranged above the article discharging device support, and
- correcting of an alignment of the one or multiple articles by rotating the article discharging device support about an axis with normal alignment to the article discharging device support if the detected actual orientation of the one or multiple articles is not identical with a target orientation of the one or multiple articles.

27. The method according to claim 23, wherein the articles comprise articles with a lower bending stiffness and articles with a higher bending stiffness and wherein, in the step b), the articles are discharged onto the stack of articles according to their bending stiffness, wherein the articles with higher bending stiffness are arranged at the bottom of the stack of articles.

28. The method according to claim 23, wherein the method further comprises:
- providing a stacking stop arranged in the region of the banding support and downstream of the band guiding plane in the second conveying direction of the second conveying system, and
- providing a transport path on the second conveying system along which the secured stack of articles is transported,
- prior to the step b), moving the stacking stop into a stacking position protruding into the transport path of the articles, and
- prior to the step d), moving the stacking stop into a release position withdrawn from the transport path.

29. The method according to claim 28, wherein
- the stacking stop is aligned at a right angle to the banding support if, in the step b), articles of essentially the same size are stacked on the banding support, and/or
- the stacking stop is aligned oblique to the banding support if, in the step b), articles of essentially different sizes and sorted according to their size are stacked on the banding support, wherein larger articles are arranged lower down in the stack of articles and smaller articles are arranged further up in the stack of articles.

30. A picking system comprising:
(a) a storage region;
(b) an article bundling device for stacking articles and securing the stack of articles with a band;
(c) a supply conveying system arranged between the storage region and the article bundling device, and configured to transport articles to the article bundling device using loading aids; and
(d) a packing machine;
wherein the article bundling device comprises:
- a banding support which defines a support plane and on which the articles are stackable,
- an automatic banding machine with a band guide, with which the band is guided around the stack of articles to form a secured stack of articles and which defines a band guiding plane which intersects with the support plane,
- a first conveying system for transporting the articles to the banding machine, arranged upstream of the banding machine in a first conveying direction, and comprising a conveying device for discharging the articles onto the banding support, wherein the conveying device defines a discharging plane arranged with an end located downstream in the first conveying direction spaced in vertical direction apart from the banding support and above the banding support, and
- a second conveying system for transporting the secured stack of articles away from the banding machine, arranged downstream of the banding machine in a second conveying direction,
- wherein the banding support has banding support tables, and
- wherein a first banding support table of the banding support tables is arranged at a first side of the band guiding plane and a second banding support table of the banding support tables is arranged at a second side of the band guiding plane opposite the first banding support table;
wherein the packing machine is configured for packing the secured stack of articles into a shipping package,
wherein the packing machine is connected with the article bundling device via a shipping conveying system, the shipping conveying system being adjoined to the second conveying system of the article bundling device, and
wherein the secured stack of articles is transported from the article bundling device to the packing machine by means of the shipping conveying system.

31. A picking system comprising:
(a) a storage region;
(b) an article bundling device for stacking articles and securing the stack of articles with a band;
(c) a supply conveying system arranged between the storage region and the article bundling device, and configured to transport articles to the article bundling device using loading aids; and
(d) a packing machine;
wherein the article bundling device comprises:
- a banding support which defines a support plane and on which the articles are stackable,
- an automatic banding machine with a band guide, with which the band is guided around the stack of articles to form a secured stack of articles and which defines a band guiding plane which intersects with the support plane,
- a first conveying system for transporting the articles to the banding machine, arranged upstream of the banding machine in a first conveying direction, and comprising a conveying device for discharging the articles onto the banding support, wherein the conveying device defines a discharging plane arranged with an end located downstream in the first conveying direction spaced in vertical direction apart from the banding support and above the banding support, and
- a second conveying system for transporting the secured stack of articles away from the banding machine, arranged downstream of the banding machine in a second conveying direction,
- wherein the first conveying system is arranged at a first side of the band guiding plane and the second conveying system is arranged at a second side of the band guiding plane opposite the first conveying system;
wherein the packing machine is configured for packing the secured stack of articles into a shipping package,
wherein the packing machine is connected with the article bundling device via a shipping conveying system, the shipping conveying system being adjoined to the second conveying system of the article bundling device, and wherein the secured stack of articles is transported from the article bundling device to the packing machine by means of the shipping conveying system.

* * * * *